(12) United States Patent
Kobayashi et al.

(10) Patent No.: US 9,416,233 B2
(45) Date of Patent: Aug. 16, 2016

(54) COMPOSITE POLYAMIDE FINE PARTICLES AND METHOD OF PRODUCING SAME

(71) Applicant: Toray Industries, Inc., Tokyo (JP)

(72) Inventors: Hiroshi Kobayashi, Nagoya (JP); Takahiko Otsubo, Nagoya (JP); Hiroshi Takezaki, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/378,817

(22) PCT Filed: Feb. 8, 2013

(86) PCT No.: PCT/JP2013/053104
§ 371 (c)(1),
(2) Date: Aug. 14, 2014

(87) PCT Pub. No.: WO2013/122008
PCT Pub. Date: Aug. 22, 2013

(65) Prior Publication Data
US 2015/0031834 A1    Jan. 29, 2015

(30) Foreign Application Priority Data

Feb. 15, 2012 (JP) ................................. 2012-030075

(51) Int. Cl.
| | | |
|---|---|---|
| *C08L 77/00* | (2006.01) | |
| *C08J 3/14* | (2006.01) | |
| *C08L 101/00* | (2006.01) | |
| *C08L 77/02* | (2006.01) | |
| *C08L 77/06* | (2006.01) | |
| *C08G 73/10* | (2006.01) | |
| *C08G 73/14* | (2006.01) | |

(52) U.S. Cl.
CPC .. *C08J 3/14* (2013.01); *C08L 77/02* (2013.01); *C08L 77/06* (2013.01); *C08L 101/00* (2013.01); *C08G 73/1046* (2013.01); *C08G 73/14* (2013.01); *C08J 2329/04* (2013.01); *C08J 2477/00* (2013.01); *C08J 2477/02* (2013.01)

(58) Field of Classification Search
None
See application file for complete search history.

(56) References Cited

U.S. PATENT DOCUMENTS

| 2010/0098880 A1* | 4/2010 | Senff | C08L 77/02 427/554 |
|---|---|---|---|
| 2011/0070442 A1* | 3/2011 | Asano | C08G 75/23 428/402 |
| 2013/0056107 A1* | 3/2013 | Oyaizu | C08L 77/06 138/137 |

FOREIGN PATENT DOCUMENTS

| JP | 2008-239638 A | 10/2008 |
|---|---|---|
| JP | 2010-018684 A | 1/2010 |
| JP | 2010-132811 A | 6/2010 |
| JP | 4574978 B2 | 8/2010 |
| JP | 2011-094128 A | 5/2011 |
| WO | 2009/142231 A1 | 11/2009 |

* cited by examiner

*Primary Examiner* — Ana Woodward
(74) *Attorney, Agent, or Firm* — DLA Piper LLP (US)

(57) ABSTRACT

Composite polyamide fine particles include a polyamide (A1) which has a melting point or a glass transition temperature of over 100° C. and a polymer (A2) which is different from the polyamide (A1). The composite polyamide fine particles have: a dispersion structure in which a plurality of domains each having an average particle diameter of 0.05 to 100 μm whose main component is the polymer (A2) are dispersed in a polyamide (A1) based matrix; an average particle diameter of 0.1 to 500 μm; and a sphericity of 80 or more.

4 Claims, 1 Drawing Sheet

COMPOSITE POLYAMIDE FINE PARTICLES AND METHOD OF PRODUCING SAME

TECHNICAL FIELD

This disclosure relates to novel composite polymer fine particles and a method of producing the same, the novel composite polymer fine particles having various properties and characteristics that cannot be achieved by polymer fine particles comprising a single type of polyamide.

BACKGROUND

The polymer fine particles mean fine particles composed of a polymer, and the fine particles generally have a wide range of diameters from several tens of nm to several hundreds of μm. Different from polymer molded products such as films, fibers, injection molded products, and extrusion molded products, polymer fine particles are used for modification and improvement of various materials by utilizing the large specific surface area and the structure of fine particles. Their major uses include modifiers for cosmetics, additives for toners, rheology modifiers for paints and the like, agents for medical diagnosis and examination, and additives for molded products such as automobile materials and construction materials.

In particular, they have been in wider use in recent years due to the advantageous particle structure of polymer fine particles, as materials for rapid prototyping and rapid manufacturing, i.e., techniques to produce custom-made molded products combining with laser processing technologies. To yield the best possible effect of the fine particles in such a use, there are increasing demands for polymer fine particles having various properties such as high sphericity and narrow particle size distribution in addition to high mechanical properties, high heat resistance and high solvent resistance.

Under such a situation, polyamide fine particles are being developed in recent years from the viewpoint of their excellent fracture toughness, impact resistance and chemical resistance, and their good heat resistance and solvent resistance, and are used in a variety of areas such as modifiers for epoxy resin, cosmetic foundations, and materials for rapid prototyping.

However, due to the increasing variety of various materials, a situation arises where there are growing demands for properties and characteristics which cannot be achieved by conventional polyamide fine particles.

Composite particle solutions of polyamide fine particles in combination with a different material are proposed to deal with such a situation (see JP-A-2008-239638, JP-A-2010-18684 and JP-A-2010-132811).

However, many of these composite particle solutions are solutions in combination with an inorganic material which impair the intrinsic properties of polyamide fine particles such as excellent fracture toughness and flexibility. To maintain the intrinsic properties of polyamide fine particles and yield a further improvement in their properties and characteristics, it is preferred to produce a composite of a polyamide in combination with a different polymer. One example of such a composite polymer fine particle is a core-shell structure. However, when polyamide component forms shell, when the shell is thin the properties of core components are exhibited strongly instead of the intrinsic properties of polyamide fine particles, and when the shell is thick the effect of the composition becomes small. On the other hand, when polyamide component forms core, although there may be an advantage in surface modification of polyamide fine particles, there are inadequacies in improving the own properties and characteristics of fine particles. Due to these reasons and from the viewpoint of improvements in polymer properties and characteristics obtained by the composition, a preferred structure of composite polyamide fine particles is a structure in which a different component is dispersed in a matrix and whose representative example is an ABS resin.

As an example of the composition of polyamide fine particles, there are disclosed composite polyamide fine particles obtained by removing media components after melting and kneading all raw materials of polymers (see JP-B-4574978), and it is presumed that polymer fine particles having a sea-island structure or the like can be obtained when there is a high compatibility between polyamide and a polymer to be composited. However, when their difference is relatively large, namely, in the case where the compatibility between polyamide and a polymer to be composited is relatively low, only a core-shell structure is obtained. Thus, there is substantially no disclosure of a method of obtaining a desired dispersion structure.

Additionally, although the composite polymer fine particles obtained by that method are mostly spherical or globular in shape, the fine particles contain irregular ones partially, thus it is necessary to remove these irregular fine particles when globular particles are required. However, it is very difficult to remove only irregular ones from a huge number of particles.

Further, in that method it is necessary to raise the kneading temperature to the melting point of polymer material or higher. Thus, when the fusion temperatures of polymers are largely different from each other, it is difficult to control the composition because of the problems such as the viscosity difference between polymer materials or the like.

As described above, it is the current status that spherical composite polyamide fine particles and a method of producing thereof are not discovered yet, the spherical composite polyamide fine particles having a structure in which, in a polyamide matrix, a different polymer having a relatively low compatibility is dispersed.

It could therefore be helpful to provide novel composite polyamide fine particles in which excellent fracture toughness, impact resistance, chemical resistance and the like intrinsic to polyamide fine particles are not impaired and which have various properties and characteristics such as high fracture toughness, impact resistance and heat resistance that cannot be achieved by polymer fine particles comprising a single type of polyamide, and to provide a method of industrially and advantageously producing the composite polyamide fine particles without being limited by the types of polymer to be composited.

SUMMARY

We thus provide:

[1] Composite polyamide fine particles comprising a polyamide (A1) having a melting point or a glass transition temperature higher than 100° C. and a polymer (A2) different from the polyamide (A1), said polymer (A2) comprises at least one selected from the group consisting of a polyamide different from said polyamide (A1), a polyamide elastomer, a polyester, a polyester elastomer, an amorphous polyarylate, a polycarbonate, a polyethersulfone, a polyarylene ether, a polyetherimide, a polyamideimide, a polyether ketone and a polyetherether ketone wherein the composite polyamide fine particles have a dispersion structure in which a plurality of domains each having a particle diameter of 0.05 to 100 μm whose main component is the polymer (A2) are dispersed in a matrix having the polyamide (A1) as its main component, and the composite polyamide fine particles have an average particle diameter of 0.1 to 500 μm and a sphericity of 80 or more, and, when solubility parameters of said polyamide (A1) and said polymer (A2) are referred to as $\delta_{A1}$ and $\delta_{A2}$, respectively, a relation of $|\delta_{A1}-\delta_{A2}|\geq 1.6[(J/cm^3)^{1/2}]$ is satisfied.

[2] The composite polyamide fine particles according to [1], wherein a content of the polymer (A2) is 0.1 to 50 volume % relatively to the whole of the composite polyamide fine particles.

[3] The composite polyamide fine particles according to [1] or [2], wherein a particle size distribution index of the composite polyamide fine particles is 1 to 3.

[4] A method of producing composite polyamide fine particles, characterized in that, in a system which, when a polyamide (A1), a polymer (A2) comprising at least one selected from the group consisting of a polyamide different from said polyamide (A1), a polyamide elastomer, a polyester, a polyester elastomer, a polycarbonate, a polyethersulfone, a polyarylene ether, a polyetherimide, an amorphous polyarylate, a polyamideimide, a polyether ketone and a polyetherether ketone and at least one polymer (B) selected from the group consisting of a poly(vinyl alcohol), a poly(ethylene glycol), a cellulose derivative and a polyacrylamide are dissolved in an organic solvent and mixed together, causes phase separation into two phases of a solution phase having a (A1) component and a (A2) component as its main components and a solution phase having a (B) component as its main component, after an emulsion is formed, the (A1) component is precipitated by bringing a poor solvent for the (A1) component into contact with the emulsion, and, when solubility parameters of said polyamide (A1) and said polymer (A2) are referred to as $\delta_{A1}$ and $\delta_{A2}$, respectively, a relation of $|\delta_{A1}-\delta_{A2}|\geq 1.6[(J/cm^3)^{1/2}]$ is satisfied.

[5] The method of producing composite polyamide fine particles according to [4], wherein said polyamide (A1) has a melting point or a glass transition temperature of 100° C. or more.

[6] The method of producing composite polyamide fine particles according to [4] or [5], wherein, when solubility parameters of the polyamide (A1), the polymer (A2) and the polymer (B) are referred to as $\delta_{A1}$, $\delta_{A2}$ and $\delta_B$, respectively, a relation of $|\delta_B-\delta_{A1}|\geq 1[(J/cm^3)^{1/2}]$ are satisfied, and either $\delta_B>\delta_{A1}\delta_{A2}$ or $\delta_B<\delta_{A1}<\delta_{A2}$ is satisfied.

[7] The method of producing composite polyamide fine particles according to any one of [4] to [6], wherein the organic solvent comprises at least one selected from the group consisting of N-methyl-2-pyrrolidone, dimethyl sulfoxide, N,N-dimethyl formamide, N,N-dimethyl acetamide and 1,3-dimethyl-2-imidazolidinone.

Our composite polyamide fine particles having a dispersion structure (hereinafter, also referred to simply as composite polymer fine particles or polymer fine particles) are fine particles in which excellent fracture toughness, impact resistance, chemical resistance and the like intrinsic to polyamide fine particles are not impaired, which have various properties and characteristics such as high fracture toughness, impact resistance and heat resistance that cannot be achieved by polymer fine particles comprising a single type of polyamide, and which have a narrow particle size distribution and a high sphericity. The composite polyamide fine particles are suitable for various industrial uses such as modifiers for epoxy resin, various spacers, frosting agents for paints, abrasives, fixatives for pigments, solid lubricants, glidants, and removers.

DETAILED DESCRIPTION

Figure 1:
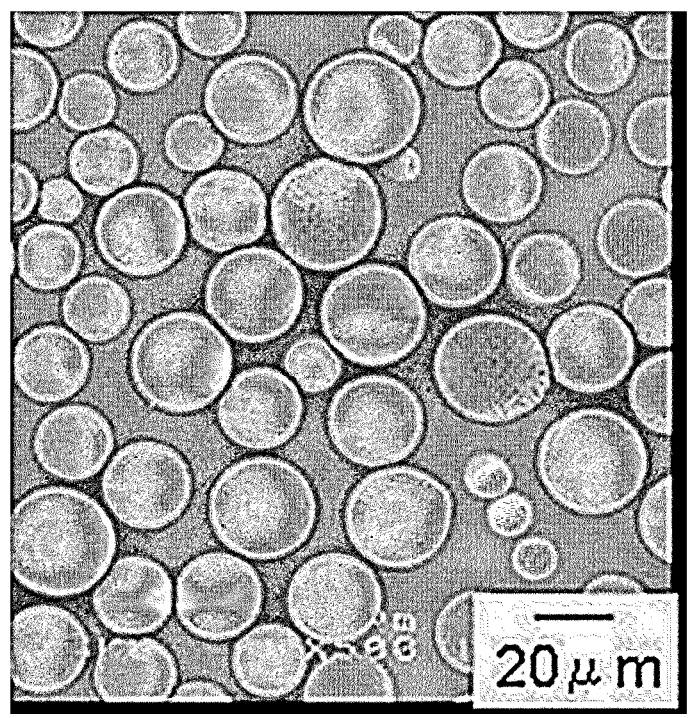
FIG. 1 is an observation diagram where composite polyamide fine particles according to an example are observed using a scanning electron microscope.

Hereinafter, our fine particles and methods will be explained in detail.

Our composite polyamide fine particles are composite polyamide fine particles comprising a polyamide (A1) having a melting point or a glass transition temperature higher than 100° C. and a polymer (A2) different from the polyamide (A1), wherein the composite polyamide fine particles have a dispersion structure in which a plurality of domains each having a particle diameter of 0.05 to 100 μm whose main component is the polymer (A2) are dispersed in a matrix having the polyamide (A1) as its main component, and the composite polyamide fine particles have an average particle diameter of 0.1 to 500 μm and a sphericity of 80 or more.

The polyamide (A1) is preferably a polyamide having high heat resistance and having a melting point or a glass transition temperature of 100° C. or more. The melting point or the glass transition temperature is preferably 120° C. or more, more preferably 140° C. or more, further preferably 160° C. or more, particularly preferably 180° C. or more, and extremely preferably 200° C. or more. When in this range, the composite polyamide fine particles resist fusing at a high temperature, and the composite polyamide fine particles according to this example are suitable for modifiers for epoxy resin, and the like.

The melting point or the glass transition temperature is measured as follows.

Melting Point

The melting point is a peak top temperature of a melting peak observed in DSC curve that is obtained by using a differential scanning calorimeter (DSC, for example, Robot DSC supplied by Seiko Instruments Inc.) under nitrogen atmosphere, heating at a heating rate of 20° C./min. from 30° C. up to a temperature 30° C. higher than the melting point of the polymer followed by keeping the temperature for 1 minute, cooling at a cooling rate of 20° C./min. down to 0° C. followed by keeping the temperature for 1 minute, and then measuring the DSC curve while heating again at a heating rate of 20° C./min.

If the value of heat of fusion is lower than 1 J/g in the measurement, the value is not regarded as the melting point, and a glass transition point measured by the later-described method is used as an index of heat resistance.

The DSC curve is a curve plotted by a differential scanning calorimetry in which the vertical axis represents a differential between thermal energy inputs applied to a sample and a standard material per unit time, the thermal energy inputs being applied to the sample and the standard material respectively to equalize their temperatures, and the horizontal axis represents temperature.

Glass Transition Temperature

The glass transition temperature is determined based on the DSC curve obtained at the above-described second heating in the DSC measurement, and defined as a temperature of an intersection point where a straight line equidistant from two extrapolated baselines of high temperature side and low temperature side as measured in the vertical axis direction intersects a segment of the curve showing a step change of glass transition.

The polyamide (A1) may be a polyamide obtained by condensation polymerization of any of a lactam having at least three-membered ring, an amino carboxylic acid that is polymerizable, a diprotic acid in combination with a diamine, a salt of a diprotic acid and a diamine, and a mixture of those.

Representative examples of such a polyamide include polycaproamide (nylon 6), poly(hexamethylene adipamide) (nylon 66), poly(pentamethylene adipamide) (nylon 56), poly(tetramethylene sebacamide) (nylon 410), poly(pentamethylene sebacamide) (nylon 510), poly(hexamethylene sebacamide) (nylon 610), poly(decamethylene sebacamide) (nylon 1010), polyundecanamide (nylon 11), polydodecanamide (nylon 12), poly(pentamethylene terephthalamide) (nylon 5T), poly(hexamethylene terephthalamide) (nylon 6T), poly(decamethylene terephthalamide) (nylon 10T), and a copolymer of 4,4'-diaminodicyclohexyl methane and decane dicarboxylic acid (such as "TROGAMID" (registered trademark) CX7323, supplied by Daicel-Evonik Ltd.) are exemplified, and as amorphous polyamides, a copolymer of 3,3'-dimethyl-4,4'-diaminodicyclohexyl methane, isophthalic acid, and 12-aminododecanoic acid (such as "Grilamid" (registered trademark) TR55, supplied by EMS-CHEMIE (Japan) Ltd.), a copolymer of 3,3'-dimethyl-4,4'-diaminodicyclohexyl methane and decane dicarboxylic acid (such as "Grilamid" (registered trademark) TR90, supplied by EMS-CHEMIE (Japan) Ltd.), and a mixture of a copolymer of 3,3'-dimethyl-4,4'-diaminodicyclohexyl methane, isophthalic acid, and 12-amino dodecanoic acid and a copolymer of 3,3'-dimethyl-4,4'-diaminodicyclohexyl methane and decane dicarboxylic acid (such as "Grilamid" (registered trademark) TR70LX, supplied by EMS-CHEMIE (Japan) Ltd.).

One or more types of the above-described polyamides can be used as the polyamide (A1).

These preferred polyamides have excellent thermal and/or mechanical properties. The composite polyamide fine particles using the polyamides as material have a narrow particle size distribution and excellent handleability, and therefore it is possible to obtain composite polyamide fine particles of high quality. Furthermore, such fine particles are preferred from the viewpoint of serving the uses where the conventional fine particles cannot be applied to.

Although the polymer (A2) is not particularly limited as long as the polymer (A2) is different from a polymer selected as the above-described polyamide (A1), the polymer (A2) means a polymer, preferably a synthetic polymer which does not exist in nature, more preferably a water-insoluble polymer. Representative examples of the polymer (A2) include, for example, a thermoplastic resin.

Representative thermoplastic resins include a polyamide other than those selected as the polyamide (A1), a polyamide elastomer, a polyester, a polyester elastomer, an amorphous polyarylate, a polyarylene ether, a polyarylene sulfide, a polysulfone, a polyether sulfone, a polyether ketone, a polyetherether ketone, a polycarbonate, a polyimide, a polyamideimide, a polyetherimide, a polyurethane, a polyacetal, a silicone, and a copolymer of those.

The "polyamide other than those selected as the polyamide (A1)" means any of aliphatic polyamides, alicyclic polyamides and aromatic polyamides that are described above as an example of the polyamide (A1).

Representative examples of the polyamide elastomer include a block copolymer obtained by condensation copolymerization of polyamide blocks having reactive carboxyl terminal ends and polyether blocks having reactive terminal ends of polyether polyol (polyether diol). (The bond between a polyamide block and a polyether block may be, for example, an ester bond.)

As the polyamide elastomer, it is possible to use a block copolymer whose hard segment contains any polyamide component of the aliphatic, alicyclic and aromatic polyamides shown as the above-described polyamide (A1) and whose soft segment contains at least one polyalkylene ether polyol component, particularly preferably polyalkylene ether diol component, and preferably any component of poly(ethylene glycol), poly(propylene glycol), poly(trimethylene glycol), poly(tetramethylene glycol) and a mixture of those.

Any of commercially available supplies can be used as the polyamide elastomer, and representative examples of such supplies include "Pebax (registered trademark)" 33, 13, 31 and 11 series supplied by Arkema, "VESTAMID (registered trademark)" E series supplied by Daicel-Evonik Ltd., and "UBESTA (registered trademark)" XPA supplied by Ube Industries, Ltd.

It is possible to mix the polyamide elastomer with other ingredients such as pigments, dispersant, antioxidants, UV absorbents, UV stabilizers, plasticizers and inorganic fillers (zinc oxide, barium sulfate, titanium dioxide and the like).

Representative polyesters include a polymer having units of multivalent carboxylic acid or its ester-forming derivative and units of multivalent alcohol or its ester-forming derivative as its construction units, a polymer having hydroxy carboxylic acid or lactone as its construction units, and a copolymer of those.

Representative examples of polyester include poly(ethylene terephthalate), poly(propylene terephthalate), poly(butylene terephthalate), poly(cyclohexane dimethylene terephthalate), poly(hexylene terephthalate), poly(ethylene naphthalate), poly(propylene naphthalate), poly(butylene naphthalate), poly(ethylene isophthalate/terephthalate), poly(propylene isophthalate/terephthalate), poly(butylene isophthalate/terephthalate), poly(ethylene terephthalate/naphthaate), poly(propylene terephthalate/naphthalate), poly(butylene terephthalate/naphthalate), poly(butylene terephthalate/decane dicarboxylate), poly(ethylene terephthalate/cyclohexane dimethylene terephthalate), a polyetherester (for example, poly(ethylene terephthalate)/poly(ethylene glycol), poly(propylene terephthalate)/poly(ethylene glycol), poly(butylene terephthalate)/poly(ethylene glycol), poly(ethylene terephthalate)/poly(tetramethylene glycol), poly(propylene terephthalate)/poly(tetramethylene glycol), poly(butylene terephthalate)/poly(tetramethylene glycol), poly(ethylene terephthalate/isophthalate)/poly(tetramethylene glycol), poly(propylene terephthalate/isophthalate)/poly(tetramethylene glycol), and poly(butylene terephthalate/isophthalate)/poly(tetramethylene glycol)), poly(ethylene terephthalate/succinate), poly(propylene terephthalate/succinate), poly(butylene terephthalate/succinate), poly(ethylene terephthalate/adipate), poly(propylene terephthalate/adipate), poly(butylene terephthalate/adipate), poly(ethylene terephthalate/sebacate), poly(propylene terephthalate/sebacate), poly(butylene terephthalate/sebacate), poly(ethylene terephthalate/isophthalate/adipate), poly(propylene terephthalate/isophthalate/adipate), poly(butylene terephthalate/isophthalate/succinate), poly(butylene terephthalate/isophthalate/adipate), poly(butylene terephthalate/isophthalate/sebacate), bisphenol A/terephthalic acid, bisphenol A/isophthalic acid, bisphenol A/terephthalic acid/isophthalic acid, poly(glycolic acid), poly(lactic acid), poly(3-hydroxybutyric acid), poly(3-hydroxyvaleric acid), polybutyrolactone, and polycaprolactone.

Among these, a polyether ester is preferred which is a thermoplastic resin having ether bonds. As an example of such a polyether ester, it is possible to use what is called a polyester elastomer, for example, a commercially available polymer such as "Hytrel (registered trademark)" supplied by DU PONT-TORAY CO. LTD. and Du Pont Kabushiki Kaisha.

Particularly, when an amorphous polyarylate is employed as a polyester, from the viewpoint of solubility in the organic solvent it is possible to produce fine particles more conveniently due to the ease of selecting the organic solvent, and it is possible to obtain fine particles having an excellent heat resistance. As an example of such an amorphous polyarylate, preferably used are bisphenol A/terephthalic acid, bisphenol A/isophthalic acid, bisphenol A/terephthalic acid/isophtalic acid and the like.

The polyarylene ether is a polymer consisting of aryl groups linked with ether bonds, and is exemplified by a polymer having a structure represented by Formula (1):

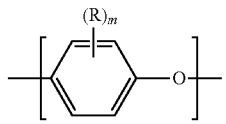

(1)

The aromatic ring in the formula may or may not contain the substituent R, and the number of substituents, m, is not less than 1 and not more than 4. Preferred substituents are the following: saturated hydrocarbon groups having a carbon number of 1 to 6 such as methyl group, ethyl group and propyl group; unsaturated hydrocarbon groups such as vinyl group and allyl group; halogen groups such as fluorine atom, chlorine atom and bromine atom; and other groups such as amino group, hydroxyl group, thiol group, carboxyl group, and carboxyl aliphatic hydrocarbon ester group.

Representative polyarylene ethers include poly(2,6-dimethyl phenylene ether).

The polyarylene sulfide is a polymer consisting of aryl groups linked with sulfide bonds, and is exemplified by a polymer having a structure represented by Formula (2):

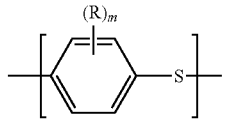

(2)

The aromatic ring in the formula may or may not contain the substituent R, and the number of substituents, m, is not less than 1 and not more than 4. Representative substituents include the following: saturated hydrocarbon groups such as methyl group, ethyl group and propyl group; unsaturated hydrocarbon groups such as vinyl group and allyl group; halogen groups such as fluorine atom, chlorine atom and bromine atom; and others such as amino group, hydroxyl group, thiol group, carboxyl group, and carboxyl aliphatic hydrocarbon ester group. It is also possible that any unit of a meta-phenylene unit, an ortho-phenylene unit, and a copolymer thereof may be used instead of the para-phenylene sulfide unit in Formula (2).

Representative polyarylene sulfides include polyphenylene sulfide.

Preferably, the polysulfone is exemplified by a polymer having a structure represented by Formula (3):

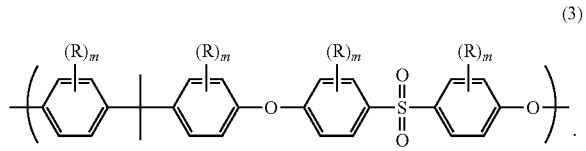

(3)

(R represents an alkyl group having a carbon number of 1 to 6 or an aryl group having a carbon number of 6 to 8, and m represents an integer of 0 to 4.)

The polyether ketone is a polymer having ether bonds and carbonyl groups. More specifically, preferred polyether ketones include a polymer having a structure represented by Formula (4):

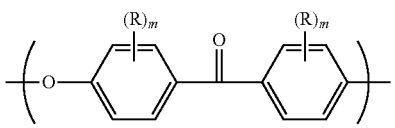

(4)

(R represents an alkyl group having a carbon number of 1 to 6 or an aryl group having a carbon number of 6 to 8, and m represents an integer of 0 to 4.)

A polyether ketone having a structure represented by Formula (5) is referred to as polyetherether ketone:

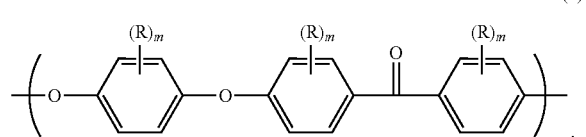

(5)

(R represents an alkyl group having a carbon number of 1 to 6 or an aryl group having a carbon number of 0 to 4, and m represents an integer of 0 to 4.)

The polycarbonate is a polymer having carbonate groups, and preferred polycarbonates include a polymer having a structure represented by Formula (6):

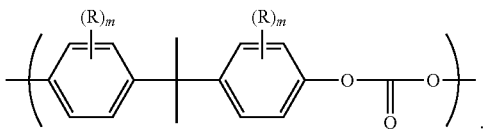

(6)

(R represents an alkyl group having a carbon number of 1 to 6 or an aryl group having a carbon number of 6 to 12, and m represents an integer of 0 to 4.)

Representative polycarbonates include a polymer obtained by condensation polymerization of bisphenol A linked by carbonate ether bonds, a polymer obtained by condensation polymerization of naphthalenediol linked by carbonate ether bonds, a polymer obtained by polymerization condensation of diphenylene sulfide diol linked by carbonate ether bonds, a polymer obtained by polymerization condensation of diphenylene disulfide diol linked by carbonate ether bonds and the like. It is also possible to use a polymer obtained by copolymerization of polycarbonate and any of the above-described polyesters.

The polyethersulfone is a polymer having a structure represented by Formula (7-1) and/or Formula (7-2):

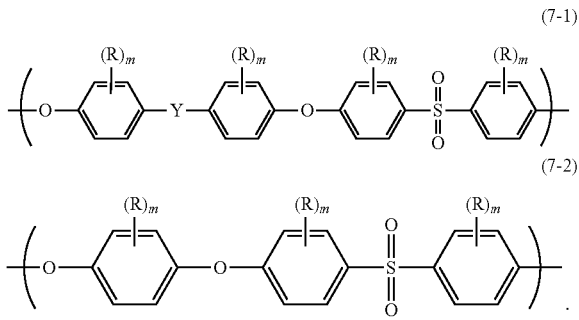

(Each R can be either the same or different from each other and represents any one selected from an alkyl group having a carbon number of 1 to 6 and an aryl group having a carbon number of 6 to 8, and m represents an integer of 0 to 3. Y represents any one selected from oxygen, sulfur, $SO_2$, CO, $C(CH_3)_2$, $CH(CH_3)$, and $CH_2$.)

The polyimide is a polymer having imide bonds. In this system, preferred are thermoplastic polyimides such as a condensation polymer of 1,2,4,5-benzene tetracarboxylic dianhydride and 4,4'-bis(3-aminophenyloxy)biphenyl, and a condensation polymer of 4,4'-biphenyltetracarboxylic dianhydride and 1,3-bis(4-aminophenyloxy)benzene.

The polyamideimide is a polymer having imide bonds and amide bonds.

The polyetherimide is a polymer having ether bonds and imide bonds in molecule, and is exemplified by a polymer obtained by condensation of 4,4'-[isopropylidene bis(p-phenyleneoxy)] diphthalic dianhydride and m-phenylenediamine.

The polymer (A2) is preferably a polymer which can improve at least one property or characteristic of the polyamide (A1). Further, because it is a polymer which is more excellent in mechanical properties such as fracture toughness and impact resistance in comparison with the polyamide (A1) and which is excellent in thermal properties due to its melting point or glass transition point higher than that of the polyamide (A1), the polymer (A2) is a polymer selected from the group consisting of a polyamide different from the polyamide (A1), a polyamide elastomer, a polyester, a polyester elastomer, an amorphous polyarylate, a polycarbonate, a polyethersulfone, a polyarylene ether, a polyetherimide, a polyamideimide, a polyether ketone and a polyetherether ketone.

Although the range of properties and characteristics improved by a combination of (A1) and (A2) is not particularly restricted, a polyamide, a polyamide elastomer, a polyester and a polyester elastomer are suitable for improving mechanical properties of the polyamide (A1). Further, an amorphous polyarylate, a polycarbonate, a polyethersulfone, a polyarylene ether, a polyetherimide, a polyamideimide, a polyether ketone and a polyetherether ketone are particularly suitable for improving heat resistance of the polyamide (A1). In particular, from the viewpoint of a balance between characteristics improved, preferred are a polyamide elastomer, a polyester elastomer, a polycarbonate and a polyphenylene ether, more preferred are a polyamide elastomer and a polyester elastomer, and particularly preferred is a polyamide elastomer.

One or more types of polymers can be used as the above-described polymer (A2).

Each of the molecular weights of the polyamide (A1) and the polymer (A2) is preferably 1,000 to 10,000,000 in terms of weight average molecular weight. The upper limit is more preferably 1,000,000 or less, further preferably 500,000 or less, and particularly preferably 100,000 or less. The lower limit is more preferably 1,000 or more, further preferably 5,000 or more, and particularly preferably 10,000 or more. It is possible to form fine particles easily when in such a range.

The weight average molecular weight as referred to here is the weight average molecular weight value measured by gel permeation chromatography (GPC) using dimethyl formamide as solvent and converted in terms of polystyrene.

Tetrahydrofuran is used if dimethyl formamide does not serve for the measurement, and hexafluoroisopropanol is used if measurement is still impossible. If it is still impossible to make measurements with hexafluoroisopropanol, 2-chloronaphthalene is used for the measurement.

The fine particles are precipitated when they are brought into contact with a poor solvent, the polyamide (A1) and the polymer (A2) are preferably polymers that cannot dissolve in the poor solvent, more preferably polymers that cannot dissolve in the poor solvent described later, and particularly preferably water-insoluble polymers.

The water-insoluble polymer means a polymer having a solubility in water of 1 mass % or less, preferably 0.5 mass % or less, further preferably 0.1 mass % or less.

The composite polyamide fine particles may have what is called a "sea-island" structure, that is to say, a dispersion structure in which a plurality of particle-like domains whose main component is a polymer (A2) different from the polyamide (A1) are dispersed in a matrix whose main component is the polyamide (A1).

The "particle-like" shape includes a spherical shape, an elliptical shape, an erythrocyte shape, a shape of a granulated substance in which spherical or elliptical particles are coagulated, an indefinite crushed shape, and a shape of a granulated substance thereof.

Further, the domain must exist at least inside a composite polyamide fine particle, and additionally, may also exist on a particle surface.

The existence of the dispersion structure can be confirmed by embedding polymer fine particles in an epoxy resin for electron microscopy, curing the resin, then preparing a sample by frozen section technique with a thickness of 0.1 μm, and thereafter observing cross-sections of particles by using a transmission electron microscope (for example, H-7100, supplied by Hitachi, Ltd.).

In the step of observing a phase structure by an electron microscope, it is possible to perform a preliminary treatment using any of various known dyes to observe a phase structure clearly.

From the viewpoint of providing improvements of fracture toughness and impact resistance caused by the sea-island structure, the average particle diameter of the above-described domains is preferably 100 μm or less, more preferably 50 μm or less, further preferably 10 μm or less, still further preferably 5 μm or less, and particularly preferably 1 μm or less. Further, the lower limit is preferably 0.05 μm. If the average particle diameter of the domains is not in the above-described range, there is a fear that the above-described improvements of characteristics may be small or may not be obtained.

The average particle diameter of the domains is preferably ⅓ or less relative to the particle diameter of the composite polyamide fine particles, more preferably ¼ or less, further preferably ⅕ or less, still further preferably ⅛ or less, and particularly preferably 1/10 or less.

It is possible to use any of various known compatibilizing agents to control the average particle diameter of domains.

Representative examples of compatibilizing agents include a block copolymer, a graft copolymer and a random copolymer which are preferably used for lowering the free energy of an interface between phase-separated phases and facilitating controls of the average particle diameter of domains and the distance between domains in the dispersion structure.

The average particle diameter of domains is calculated as follows.

Average Particle Diameter of Domains

In a manner as described above, after embedding polymer fine particles in an epoxy resin for electron microscopy and curing it, a sample is prepared by frozen section technique with a thickness of 0.1 μm, and then cross-sections of particles are observed by a transmission electron microscope (for example, H-7100, supplied by Hitachi, Ltd.). Then the cross-sectional areas of 50 domains selected randomly from the obtained transmission electron microscope photograph are measured. The average particle diameter of domains is defined as an average of diameters of true circles obtained according to the following conversion equation by converting each of 50 domains to a true circle having an area equivalent to that of corresponding domain. If less than 50 domains exist in a single particle, the measurement is performed by selecting 50 domains randomly from cross-sectional photographs of two or more particles.

$$D_{domain} = \frac{\sum_{i=1}^{n} \sqrt{4Si/\pi}}{n}$$

In the equation, $D_{domain}$ represents the average particle diameter of the domains, Si represents the cross-sectional area of each domain, and n represents the number of measurements (50).

When it is difficult to perform a measurement according to the above-described method, the average particle diameter of domains can be measured by dissolving a sample in a solvent in which only the polyamide (A1) as a matrix is dissolved, performing centrifugation and solid-liquid separation, collecting domain particles, and thereafter measuring the average particle diameter thereof with a dynamic light scattering particle size analyzer or a laser diffraction particle size analyzer. The average particle diameter referred to herein is the volume average particle diameter.

"A plurality of domains are dispersed" does not include what is called a "core-shell" structure, that is to say, a structure in which a single domain exists in a single composite polyamide fine particle. Further, even though there are a plurality of domains in a particle, a dispersion structure in which a diameter of a domain is 20 or more times larger than that of other domain is considered to be substantially same as a core-shell structure, therefore the scope of our fine particles does not include such a structure.

The number of domains in a single composite polyamide fine particle is at least 2 or more, preferably 5 or more, more preferably 10 or more, further preferably 20 or more, still further preferably 50 or more, particularly preferably 100 or more, and extremely preferably 150 or more. Further, the upper limit is not particularly limited as long as the intrinsic properties and characteristics of the polyamide (A1) such as fracture toughness, heat resistance and solvent resistance are not impaired.

The above-described number of domains is approximated by measuring the average particle diameter of composite polyamide fine particles, the content of the polymer (A2) in the fine particles and the average particle diameter of domains, and thereafter using the following equation:

$$N_{domain} = \frac{3V_p \times v_d}{4\pi(D_d/2)^3}$$

where, $V_p = (4/3)\pi(D_p/2)^3$.

In the equations, $N_{domain}$ represents the number of domains, $V_p$ represents the average volume of composite polyamide fine particles, $D_p$ represents the average particle diameter of composite polyamide fine particles, $v_d$ represents the volume fraction of the polymer (A2) in a particle, and $D_d$ represents the average particle diameter of domains.

The content of the polymer (A2) in composite polyamide fine particles is usually 50 volume % or less in polymer fine particles, and preferably 40 volume % or less because within such a range the polyamide (A1) and the polymer (A2) provide their properties and characteristics effectively. The value is more preferably 35 volume % or less, and further preferably 30 volume % or less. Further, the lower limit is preferably 0.1 volume % or more, more preferably 1 volume % or more, further preferably 5 volume % or more, and particularly preferably 10 volume % or more. If it is less than 0.1 volume %, there is a possibility that it may not be possible to obtain improvements of properties and characteristics of the polyamide (A1) that the dispersion structure affords.

The content of the polymer (A2) in the above description can be obtained as follows.

The content of the polymer (A2) can be approximated by measuring the areas of matrix portions and domain portions from the aforementioned cross-sectional photograph of particle, and converting the ratio of the areas to a volume ratio.

Further, the content of the polymer (A2) can also be obtained by extracting a soluble component from polymer fine particles by using a solvent capable of dissolving either the polyamide (A1) or the polymer (A2), and thereafter weighing the residue.

Furthermore, the content of the polymer (A2) can also be obtained by performing $^1$H-NMR (supplied by JEOL Ltd., JNM-AL400) measurement of the obtained polymer fine particles using deuterated dimethylformamide, and thereafter determining the composition ratio of the polyamide (A1) and the polymer (A2).

Deuterated tetrahydrofuran is used if deuterated hexafluoroisopropanol does not serve for the measurement, and deuterated hexafluoroisopropanol is used if measurement is still impossible. If it is still impossible to make measurements with deuterated hexafluoroisopropanol, deuterated formic acid is used for the measurement.

Further, when the polyamide (A1) and the polymer (A2) show different melting peaks in DSC measurement, the content of the polymer (A2) can be obtained by the calibration curve method using DSC. To be more specific, the method includes the steps of: first, preparing several samples in which the polyamide (A1) and the polymer (A2) are mixed at different ratios and preparing a calibration curve based on a relation of area ratios between areas of melting peaks of the polyamide (A1) and the polymer (A2) in DSC curves obtained by measuring the samples using DSC; next, performing a DSC measurement of composite polyamide fine particles and obtaining the content of the polymer (A2) from an area ratio between peaks corresponding to the melting peaks of the polyamide (A1) and the polymer (A2), respectively.

The average particle diameter of the composite polymer fine particles is preferably 0.1 to 500 µm from the viewpoint of imparting fracture toughness and impact resistance when adding the composite polymer fine particles to epoxy resin and the like. The upper limit is preferably 250 µm or less, more preferably 100 µm or less, and particularly preferably 50 µm or less. The lower limit is preferably 0.1 µm or more, further preferably 0.5 µm or more, particularly preferably 1 µm or more, and extremely preferably more than 1 µm. When in such a range, the effect as modifier can be achieved sufficiently.

It is possible to produce fine particles having a particle size distribution index of 3.0 or less, preferably 2.0 or less, more preferably 1.5 or less, particularly preferably 1.2 or less, and most preferably 1.1 or less. The preferred lower limit is 1.0.

The average particle diameter of the composite polymer fine particles can be determined by measuring diameters of 100 particles selected randomly from a scanning electron microscope photograph and calculating the arithmetic average of those.

In the photograph, when a particle is not a perfect circle, namely, when the particle has an ellipse-like shape, the longest diameter of the particle is employed as its particle diameter. To measure the particle diameter precisely, the measurement of the particle diameter is carried out after enlarging the photograph at a magnification of at least 1,000 times or more, preferably 5,000 times or more.

The particle size distribution index is calculated from the diameter of each particle measured above according to the following conversion equation:

$$Dn = \sum_{i=1}^{n} Di/n$$

$$Dv = \sum_{i=1}^{n} Di^4 \Big/ \sum_{i=1}^{n} Di^3$$

$$PDI = Dv/Dn.$$

Di represents diameter of each particle, n represents the number of measurements (100), Dn represents the number average particle diameter, Dv represents the volume average particle diameter, and PDI represents the particle size distribution index.

The sphericity can be determined by measuring the longest diameter and the shortest diameter of randomly selected 30 particles during the above-described particle observation using scanning electron microscope, and then calculating the value according to the following equation:

$$S = \frac{\sum_{i=1}^{n}(D_{Si}/D_{Li})}{n} \times 100.$$

S represents sphericity, $D_{Si}$ represents the shortest diameter, $D_{Li}$ represents the longest diameter, and n represents the number of measurements (30).

It is preferred that the composite polymer fine particles has a sphere-like shape, because such fine particles show a high degree of isotropy in mechanical property when used as additive.

The sphericity of the polymer fine particles is preferably 80 or more, more preferably 85 or more, further preferably 90 or more, particularly preferably 92 or more, and most preferably 95 or more. When the sphericity is less than 80, not only the above-described isotropy but also filling ability may be impaired, therefore such a range is not preferred. The upper limit is 100.

The minimum value of (the shortest diameter/the longest diameter) of an individual particle shown in the above-described equation is preferably 0.7 or more, more preferably 0.75 or more, further preferably 0.8 or more, and particularly preferably 0.85 or more. When the minimum value is less than 0.7, it is not preferred from the viewpoint of uniformity of the whole material. The upper limit is 1.

The method of producing the composite polymer fine particles is not particularly limited. However, the most preferred method is a method wherein, in a system which, when a polyamide (A1), a polymer (A2) different from the polyamide (A1) and a polymer (B) are dissolved in an organic solvent and mixed together, causes phase separation into two phases of a solution phase having a (A1) component and a (A2) component as its main components (hereinafter, also referred to as "the solution phase containing A1 and A2") and a solution phase having a (B) component as its main component (hereinafter, also referred to as "the solution phase containing B"), after an emulsion is formed, the (A1) component is precipitated by bringing a poor solvent for the (A1) component into contact with the emulsion.

In the above description, the "system which, when a polyamide (A1), a polymer (A2) different from the polyamide (A1) and a polymer (B) are dissolved in an organic solvent and mixed together, causes phase separation into two phases of a solution phase having a (A1) component and a (A2) component as its main components and a solution phase having a (B) component as its main component" is a system which causes phase separation into two phases of a solution phase whose main components are the (A1) component and the (A2) component out of the (A1) component, the (A2) component and the (B) component (the solution phase containing A1 and A2) and a solution phase whose main component is the (B) component (the solution phase containing B) when the polyamide (A1), the polymer (A2) and the polymer (B) are mixed together in the organic solvent.

Using such a system which causes phase separation makes it possible to form an emulsion by carrying out mixing under phase separation conditions, thereby causing emulsification.

In the above description, whether the dissolution of the polymer occurs or not is confirmed by determining whether the polymer dissolves in the organic solvent up to more than 1 mass % at a temperature at which this disclosure is carried out, that is, at a temperature at which the polyamide (A1), the polymer (A2) and the polymer (B) are dissolved and mixed to form two separate phases.

In this emulsion, the solution phase containing A1 and A2 acts as dispersed phase and the solution phase containing B acts as continuous phase. By bringing poor solvent for the (A) component into contact with this emulsion, the polyamide (A1) or the polyamide (A1) and the polymer (A2) are precipitated from the solution phase containing A1 and A2 in the emulsion, thereby obtaining composite polymer fine particles having a dispersion structure in which a plurality of domains whose main component is the polymer (A2) are dispersed in a matrix whose main component is the polyamide (A1).

It seems that formation of the above-described dispersion structure is caused by either of the following factors: first, because the solution phase containing A1+A2 as dispersed phase has already been in a state where the polymer (A2) solution phase is dispersed in the polyamide (A1) solution phase at the time of formation of the emulsion, the polyamide (A1) alone or the polyamide (A1) and the polymer (A2) are precipitated in a subsequent step and thereafter the structure is fixed as it is; second, the solution phase containing A1+A2 as dispersed phase is a solution phase in which the polyamide (A1) and the polymer (A2) are mixed homogeneously at the time of formation of the emulsion, thus the polyamide (A1) and the polymer (A2) cause phase separation in one of subsequent steps by further forming a dispersion structure in dispersed phase.

In either situation described above, when only the polyamide (A1) is precipitated, a dispersion structure in which the solution phase containing the polymer (A2) is dispersed in a polyamide (A1) matrix is obtained, and by removing the solvent in a subsequent step it is possible to obtain composite polyamide fine particles having the above-described dispersion structure.

Further, to let the composite polymer fine particles contain one or more of various additives, it is possible to carry out any of the following methods such as a method of mixing the above-described additive with either the polyamide (A1) or the polymer (A2) in advance and thereafter dissolving it in an organic solvent, a method of mixing the additive when dissolving a raw material of polymer in an organic solvent, and a method of dissolving a raw material of polymer in a solution in which the additive is dispersed in an organic solvent.

The polyamide (A1), the polymer (A2), the polymer (B), the organic solvent to dissolve them, and a poor solvent for the polyamide (A1) may be used. The combination is not particularly limited as long as composite polyamide fine particles can be obtained. However, the polyamide (A1) is a polyamide in which the above-described melting point or glass transition temperature is higher than 100° C.

As the polymer (B), preferred is a polymer having a high affinity with a poor solvent described later, and the index of the affinity can be determined by the solubility in water. With respect to the solubility in water of the polymer (B), when solubility of 1 g per 100 g of water at 25° C. is defined as 1 (g/100 g), it is preferably 1 (g/100 g) or greater, more preferably 2 (g/100 g) or greater, further preferably 5 (g/100 g) or greater, particularly preferably 10 (g/100 g) or greater, and extremely preferably 15 (g/100 g) or greater, If it is within this range, the affinity with the poor solvent described later is high, and it functions advantageously in the method of producing polymer fine particles.

As a polymer type of the polymer (B), to be more specific, preferred is a polymer having any of a hydroxyl group, an ether group, an amide group and a carboxyl group.

As an example of the polymer (B), representative examples of the polymer having a hydroxyl group in its molecular structure include poly(vinyl alcohol) groups (such as a fully saponified or a partially saponified poly(vinyl alcohol), poly(vinyl alcohol-ethylene) copolymer groups such as a fully saponified or a partially saponified poly(vinyl alcohol-ethylene) copolymer); poly(para-vinyl phenol); disaccharides such as maltose, cellobiose, lactose, and sucrose; celluloses and derivatives thereof (such as hydroxyalkyl cellulose (hydroxyethyl cellulose, hydroxypropyl cellulose, ethylhydroxyethyl cellulose and the like), cellulose, methyl cellulose, ethyl cellulose, carboxymethylethyl cellulose, carboxymethyl cellulose, carboxymethyl cellulose sodium salt, cellulose ester, chitosan and the like); polysaccharides and derivatives thereof such as amylase and derivatives thereof, starch and derivatives thereof, dextrin, cyclodextrin, and sodium alginate and derivatives thereof; and others such as gelatin, casein, collagen, albumin, fibroin, keratin, fibrin, carrageenan, chondroitin sulfate, gum arabic, agar, and protein. Representative examples of the polymer having an ether group in its molecular structure include poly(alkylene glycol), sucrose fatty acid ester, poly(oxyethylene fatty acid ester), poly(oxyethylene lauric fatty acid ester), poly(oxyethylene glycol mono-fatty acid ester), poly(oxyethylene alkyl phenyl ether), poly(oxyalkyl ether), poly(vinyl ether), poly(vinyl formal) and the like. Representative examples of the polymer having an amide group in its molecular structure include polyvinylpyrrolidone, aminopolyacrylamide, polyacrylamide, polymethacrylamide, water-soluble nylon such as AQ nylon (A-90, P-70, P-95, T-70; supplied by Toray Industries, Inc.). Representative examples of the polymer having a carboxyl group in its molecular structure include poly(acrylic acid), poly(sodium acrylate), poly(methacrylic acid), and poly(sodium methacrylate). As others, representative examples include synthetic resins such as poly(styrene sulfonic acid), poly(styrene sulfonic acid sodium salt), poly(vinyl pyrrolidinium chloride), poly(styrene-maleic acid) copolymer, poly(allyl amine), poly(oxyethylene amine), polyvinylpyridine), polyaminosulfone, and poly(ethylene imine).

Preferred are poly(vinyl alcohol) groups (such as a fully saponified or a partially saponified poly(vinyl alcohol), or poly(vinyl alcohol-ethylene) copolymer groups such as a fully saponified or a partially saponified poly(vinyl alcohol-ethylene) copolymer), cellulose derivatives (such as carboxymethyl cellulose, hydroxyalkyl cellulose (hydroxyethyl cellulose, hydroxypropyl cellulose, ethylhydroxyethyl cellulose), methyl cellulose, ethyl cellulose, carboxymethylethyl cellulose, carboxymethyl cellulose, carboxymethyl cellulose sodium salt, cellulose ester and the like), poly(alkylene glycol), sucrose fatty acid ester, poly (oxyethylene alkyl phenyl ether), poly(oxyalkyl ether), polyvinyl pyrrolidone, water-soluble nylon, poly(acrylic acid), and poly(methacrylic acid). More preferred are poly(vinyl alcohol) groups (such as a fully saponified or a partially saponified poly(vinyl alcohol), or poly(vinyl alcohol-ethylene) copolymer groups such as a fully saponified or a partially saponified poly(vinyl alcohol-ethylene) copolymer), cellulose derivatives (such as carboxymethyl cellulose, hydroxyalkyl cellulose (hydroxyethyl cellulose, hydroxypropyl cellulose, ethylhydroxyethyl cellulose), methyl cellulose, ethyl cellulose, carboxymethylethyl cellulose, carboxymethyl cellulose, carboxymethyl cellulose sodium, cellulose ester and the like), poly(alkylene glycol), polyvinylpyrrolidone, water-soluble nylon, and poly(acrylic acid). Particularly preferred are poly(vinyl alcohol) groups such as a fully saponified or a partially saponified poly(vinyl alcohol), hydroxyalkyl cellulose such as hydroxyethyl cellulose, hydroxypropyl cellulose and the like, poly(alkylene glycol), polyvinylpyrrolidone, water-soluble nylon, and poly(acrylic acid).

It is extremely preferred to use poly(vinyl alcohol) groups as the polymer (B). More specifically, the poly(vinyl alcohol) group means a polymer having a structure of Formula (8) in its molecule.

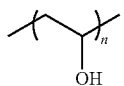

(8)

Although it may be any of a poly(vinyl alcohol) (such as a fully saponified or a partially saponified poly(vinyl alcohol). it may also be referred to simply as poly(vinyl alcohol).) and poly(vinyl alcohol-ethylene) copolymer (such as a fully saponified or a partially saponified poly(vinyl alcohol-ethylene) copolymer), a poly(vinyl alcohol) is preferred from the viewpoint of solubility.

The molecular weight of the polymer (B) is preferably 1,000 to 10,000,000 in terms of weight average molecular weight. The upper limit is more preferably 1,000,000 or less, further preferably 500,000 or less, and particularly preferably 100,000. The lower limit is more preferably 1,000 or more, further preferably 5,000 or more, and particularly preferably 10,000 or more. When within such a range, it becomes possible to produce the composite polymer fine particles easily.

The weight average molecular weight referred to herein is a weight average molecular weight value measured by gel permeation chromatography (GPC) using water as solvent and converted in terms of poly(ethylene glycol).

Dimethyl formamide is used if water does not serve for the measurement, and tetrahydrofuran is used if measurement is still impossible. If it is still impossible to make measurements with tetrahydrofuran, hexafluoroisopropanol is used for the measurement.

The organic solvent to dissolve the polyamide (A1), the polymer (A2) and the polymer (B) is an organic solvent capable of dissolving the polyamide (A1), the polymer (A2) and the polymer (B) that are used, and is selected depending upon the types of these polymers.

Representative organic solvents include the following: aliphatic hydrocarbon-based solvents such as pentane, hexane, heptane, octane, nonane, n-decane, n-dodecane, n-tridecane, cyclohexane and cyclopentane; aromatic hydrocarbon-based solvents such as benzene, toluene and xylene; ester-based solvents such as ethyl acetate and methyl acetate; halogenated hydrocarbon solvents such as chloroform, bromoform, methylene chloride, 1,2-dichloroethane, 1,1,1-trichloroethane, chlorobenzene and 2,6-dichlorotoluene; ketone-based solvents such as acetone, methyl ethyl ketone, methyl isobutyl ketone and methyl butyl ketone; alcohol-based solvents such as methanol, ethanol, 1-propanol and 2-propanol; aprotic polar solvents such as N-methyl-2-pyrrolidone, dimethyl sulfoxide, N,N-dimethyl formamide, N,N-dimethyl acetamide, propylene carbonate, trimethyl phosphate, 1,3-dimethyl-2-imidazolidinone and sulfolane; carboxylic acid solvents such as formic acid, acetic acid, propionic acid, butyric acid and lactic acid; ether solvents such as anisole, diethyl ether, tetrahydrofuran, diisopropyl ether, dioxane, diglyme and dimethoxy ethane; and mixtures of those. Preferred are aromatic hydrocarbon-based solvents, aliphatic hydrocarbon-based solvents, halogenated hydrocarbon solvents, alcohol-based solvents, ether-based solvents, aprotic polar solvents and carboxylic acid solvents.

More preferred are solvents having a solubility parameter (hereinafter, also referred to as SP value) of 20 $(J/cm^3)^{1/2}$ or more. The SP value referred to herein is a value described in pp. 688-701 of "Polymer Handbook Fourth Edition" (written by J. Brand, published by Wiley, 1998).

If the value is not described in the book, the SP value is calculated according to Fedor's estimation method. This calculation is carried out on the basis of the coagulation energy density and the molar molecular volume (hereinafter, also referred to as calculation method) ("SP value, base, application and calculation method," Hideki Yamamoto, published by Johokiko Co., Ltd., Mar. 31, 2005). The SP value of a copolymer is defined as a sum of SP values multiplied by the respective mole fraction of each component unit.

Preferred organic solvents are water-soluble solvents such as alcohol-based solvents, aprotic polar solvents and carboxylic acid solvents, and particularly preferred organic solvents are aprotic polar solvents and carboxylic acid solvents. From the viewpoints of availability, a wide range of applicability to the polyamide (A1) and the polymer (A2) due to capability of dissolving a wide variety of polymers, and capability of being homogeneously mixed with the solvent which can be preferably used as the later-described poor solvent such as water and alcohol-based solvent, The most preferred solvents are N-methyl-2-pyrrolidone, dimethyl sulfoxide, N,N-dimethyl formamide, N,N-dimethyl acetamide and 1,3-dimethyl-2-imidazolidinone.

These organic solvents may be used in combination or as a mixture. However, from the viewpoints of obtaining particles having a relatively small particle diameter and a narrow particle size distribution, and reducing the load of production process by avoiding the inconvenience of separation process in recycling the used solvent, preferred is a single organic solvent, and further preferred is a single organic solvent which can dissolve any of the polyamide (A1), the polymer (A2) and the polymer (B).

The poor solvent for the polyamide (A1) is a solvent in which the polyamide (A1) is not dissolved. The expression "the polyamide (A1) is not dissolved" here means that the solubility of the polyamide (A1) in the poor solvent is 1 mass % or less, preferably 0.5 mass % or less, and more preferably 0.1 mass % or less.

A poor solvent for the polyamide (A1) may be used in a method of producing composite polyamide fine particles. This poor solvent is preferably a solvent which is a poor solvent for both the polyamide (A1) and the polymer (A2), and at the same time a solvent which dissolves the polymer (B). However, the poor solvent is not limited as long as it is a poor solvent for the polyamide (A1), and it is not necessary for the poor solvent to be a poor solvent for the polymer (A2). By this, polymer fine particles composed of the polyamide (A1) can be precipitated efficiently. Further, it is preferred that the poor solvent for the polyamide (A1) is a solvent which can be mixed homogeneously with the solvent for dissolving the polymers of the polyamide (A1), the polymer (A2) and the polymer (B).

Although the poor solvent may vary depending upon the type of the polyamide (A1) and desirably upon the types of the polyamide (A1), the polymer (A2) and the polymer (B), representative examples of the poor solvent include at least one type of solvent selected from the following: aliphatic hydrocarbon-based solvents such as pentane, hexane, heptane, octane, nonane, n-decane, n-dodecane, n-tridecane, cyclohexane and cyclopentane; aromatic hydrocarbon-based solvents such as benzene, toluene and xylene; ester-based solvents such as ethyl acetate and methyl acetate; halogenated hydrocarbon-based solvents such as chloroform, bromoform, methylene chloride, 1,2-dichloroethane, 1,1,1-trichloroethane, chlorobenzene and 2,6-dichlorotoluene; ketone-based solvents such as acetone, methyl ethyl ketone, methyl isobutyl ketone and methyl butyl ketone; alcohol solvents such as methanol, ethanol, 1-propanol and 2-propanol; aprotic polar solvents such as dimethyl sulfoxide, N,N-dimethyl formamide, N,N-dimethyl acetamide, trimethyl phosphate, N-methyl-2-pyrrolidone, 1,3-dimethyl-2-imidazolidinone and sulfolane; carboxylic acid solvents such as formic acid, acetic acid, propionic acid, butyric acid and lactic acid; ether-based solvents such as anisole, diethyl ether, tetrahydrofuran, diisopropyl ether, dioxane, diglyme and dimethoxy ethane; and water.

From the viewpoint of making the polyamide (A1) into particles efficiently, preferred are aromatic hydrocarbon solvents, aliphatic hydrocarbon solvents, alcohol solvents and water, most preferred are alcohol solvents and water, and particularly preferred is water.

It becomes possible to precipitate the polyamide (A1) and obtain composite polymer fine particles efficiently by selecting and combining the polyamide (A1), the polymer (A2), the polymer (B), the organic solvent to dissolve them, and the poor solvent for the polyamide (A1) in an appropriate manner.

The mixed liquid dissolved with the polyamide (A1), the polymer (A2), the polymer (B) and the organic solvent to dissolve them must cause phase separation into two phases of a solution phase containing the polyamide (A1) and the polymer (A2) as its main components and a solution phase containing the polymer (B) as its main component. In this step, the organic solvent in the solution phase containing the polyamide (A1) and the polymer (A2) as its main components may be the same as or different from the organic solvent in the solution phase containing the polymer (B) as its main component, but it is preferred that these two solvents are substantially identical.

The conditions of forming the two separate phase state vary depending upon the types of the polyamide (A1), the polymer (A2) and the polymer (B), the molecular weights of the polyamide (A1), the polymer (A2) and the polymer (B), the type of the organic solvent, the concentrations of the polyamide (A1), the polymer (A2) and the polymer (B), and the temperature and pressure.

To obtain conditions where phase separation easily takes place, it is preferred that, when the SP values of the polyamide (A1) and the polymer (B) are referred to as $\delta_{A1}$ and $\delta_B$, respectively, $|\delta_B-\delta_{A1}| \geq 1[(J/cm^3)^{1/2}]$ is satisfied.

The difference between the SP values is preferably 1 $(J/cm^3)^{1/2}$ or greater, more preferably 2 $(J/cm^3)^{1/2}$ or greater, further preferably 3 $(J/cm^3)^{1/2}$ or greater, particularly preferably 5 $(J/cm^3)^{1/2}$ or greater, and extremely preferably 8 $(J/cm^3)^{1/2}$ or greater. When the SP values satisfy this range, phase separation can be easily achieved.

Although there are no specific limitations on the maximum difference between the SP values as long as both the polyamide (A1) and the polymer (B) can dissolve in the organic solvent, the maximum difference is preferably 20 $(J/cm^3)^{1/2}$ or less, more preferably 15 $(J/cm^3)^{1/2}$ or less, and further preferably 10 $(J/cm^3)^{1/2}$ or less. Additionally, the SP value of the polymer (B) is preferably 21 $(J/cm^3)^{1/2}$ or greater, more preferably 23 $(J/cm^3)^{1/2}$ or greater, further preferably 25 $(J/cm^3)^{1/2}$ or greater, particularly preferably 28 $(J/cm^3)^{1/2}$ or greater, and extremely preferably 30 $(J/cm^3)^{1/2}$ or greater.

To obtain composite polyamide fine particles having a dispersion structure in which a plurality of domains whose main component is the polymer (A2) are dispersed in a matrix whose main component is the polyamide (A1), it is preferred that, when the SP values of the polyamide (A1), the polymer (A2) and the polymer (B) are referred to as $\delta_{A1}$, $\delta_{A2}$ and $\delta_B$, respectively, $|\delta_{A1}-\delta_{A2}| \leq 1.6[(J/cm^3)^{1/2}]$ and $|\delta_B-\delta_{A1}| \geq 1[(J/cm^3)^{1/2}]$ are satisfied, and either $\delta_B > \delta_{A1} > \delta_{A2}$ or $\delta_B < \delta_{A1} < \delta_{A2}$ is satisfied.

The difference between the SP values of the polyamide (A1) and the polymer (A2) is 1.6 $(J/cm^3)^{1/2}$ or greater. If it is less than 1.6 $(J/cm^3)^{1/2}$, there is a possibility that the advantage of the dispersion structure cannot be obtained because the size of the domain becomes too small. The upper limit of the difference between the SP values is not particularly limited as long as the dispersion structure can be obtained, the upper limit is preferably 20 $(J/cm^3)^{1/2}$ or less, more preferably 15 $(J/cm^3)^{1/2}$ or less, and further preferably 10 $(J/cm^3)^{1/2}$ or less.

Appropriate conditions for phase separation can be determined based on a ternary phase diagram made from a simple preliminary test (hereinafter, also referred to as phase separation investigation) to observe the states when changing the ratio of the three components of the polyamide (A1), the polymer (B) and the organic solvent to dissolve them.

To prepare the phase diagram, the polyamide (A1) and polymer (B) are mixed and dissolved at an arbitrary ratio, and left at a stationary condition to determine whether an interface is formed. This test is carried out at least three or more ratios, preferably at five or more ratios, more preferably at 10 or more ratios. By determining the range where two phase separation takes place and the range where only one phase forms, the conditions for desired phase separation can be found.

In that test, whether a phase-separated state is formed or not can be judged by adjusting the ratio of the polyamide (A1) and the polymer (B) to a given ratio under the temperature and pressure conditions, then dissolving the polyamide (A1) and the polymer (B) completely, stirring the solution thus obtained sufficiently, leaving the stirred solution at a stationary condition for three days, and thereafter observing the resultant solution to determine whether phase separation occurs macroscopically. However, when a sufficiently stable emulsion is formed, a macroscopic phase separation may not occur even after being left at a stationary condition for three days. In such a case, the occurrence of phase separation is determined on the basis of microscopic phase separation observation using an optical microscope or phase contrast microscope.

To select a condition to obtain the above-described dispersion structure, the above-described phase separation investigation is carried out on both the polyamide (A1) and the polymer (A2) to confirm that both of them cause phase separation.

From the viewpoint of causing phase separation and ensuring industrial feasibility, the total concentration of the polyamide (A1), the polymer (A2) and the polymer (B) in the organic solvent is preferably more than 1 mass % and not more than 50 mass % relative to the total mass, on the precondition that the polymers can actually dissolve in the organic solvent. The upper limit is more preferably 30 mass % or less, and most preferably 20 mass % or less. The lower limit is preferably 2 mass % or more, and most preferably 3 mass % or more.

The polymer fine particles can be produced by using the phase-separation system thus obtained, mixing the phase-separated liquid phases in the system to form an emulsion, and thereafter bringing a poor solvent into contact with the emulsion.

For producing fine particles, the steps of forming an emulsion and bringing a poor solvent into contact with the emulsion are carried out in a usual reaction vessel. From the viewpoint of industrial feasibility, the suitable temperature is 10° C. to 300° C. The upper limit is preferably 280° C. or lower, more preferably 260° C. or lower, further preferably 240° C. or lower, particularly preferably 220° C. or lower, and extremely preferably 200° C. or lower. The lower limit is preferably 20° C. or higher, more preferably 30° C. or higher, further preferably 40° C. or higher, particularly preferably 50° C. or higher, and extremely preferably 60° C. or higher.

From the viewpoint of industrial feasibility, the suitable pressure is standard pressure to 100 atm (10.1 MPa). The upper limit is preferably 50 atm (5.1 MPa) or lower, more preferably 30 atm (3.0 MPa) or lower, and further preferably 20 atm (2.0 MPa) or lower. The lower limit is preferably 1 atm (101.3 kPa) or higher.

The step of making fine particles may be carried out under a high temperature and high pressure condition where thermal decomposition of the polyamide (A1), the polymer (A2), the polymer (B) or the organic solvent is liable to be accelerated. Therefore, it is preferred to carry out the step under a condition where the oxygen concentration is as low as possible.

The oxygen concentration of the atmosphere in the reaction vessel is preferably 5 volume % or less, more preferably 1 volume % or less, further preferably 0.1 volume % or less, still further preferably 0.01 volume % or less, and particularly preferably 0.001 volume % or less.

Because the measurement of a very small oxygen concentration is substantially difficult, the oxygen concentration is to be theoretically calculated from the capacity of the reaction vessel, the oxygen volume concentration of an inert gas, the substituted pressure in the vessel and the times thereof.

Further, for the reaction vessel, it is preferred to use an inert gas. Representative examples include nitrogen, helium, argon and carbon dioxide, and preferred are nitrogen and argon.

Further, from the viewpoint of preventing deterioration due to oxidation of the raw material used for making fine particles, an antioxidant may be used as an additive.

Because it is added for the purpose of trapping the radical, the antioxidant is represented by, for example, phenolic antioxidant, sulfuric antioxidant, aromatic amine antioxidant, and phosphoric antioxidant.

Representative antioxidants include phenol, hydroquinone, p-methoxy phenol, benzoquinone, 1,2-naphthoquinone, cresol, catechol, benzoic acid, hydroxyl benzoic acid, salicylic acid, hydroxyl benzene sulfonic acid, 2,5-di-t-butyl hydroquinone, 6-t-butyl-m-cresol, 2,6-di-t-butyl-p-cresol, 4-t-butylcatechol, 2,4-dimethyl-6-t-butylphenol, 2-t-butyl hydroquinone, and 2-butyl-4-methoxy phenol.

Although the concentration of the antioxidant is not particularly restricted, it is preferably 0.001-10 mass % relative to the mass of the polymer (B). The upper limit is more preferably 5 mass % or less, and most preferably 3 mass % or less. The lower limit is more preferably 0.01 mass % or more, and most preferably 0.05 mass % or more.

An emulsion is formed by mixing respective phases together under such a condition. Namely, an emulsion is produced by adding a shear force to the phase-separation solution obtained as described above.

The fine particles produced by the production process have a very narrow particle size distribution. This is because emulsions of highly uniform size can be obtained in the steps of forming the emulsion. This tendency is remarkable in the case where a single solvent to dissolve any of the polyamide (A1), the polymer (A2) and the polymer (B) is used. Therefore, it is sufficient to use a known stirring method of the purpose of obtaining a sufficient shear force to form an emulsion, and the mixing can be carried out by using one of the known methods such as liquid phase stirring using stirring blades, stirring in a continuous twin mixer, mixing in a homogenizer, ultrasonic irradiation and the like.

More specifically, in the case of stirring using stirring blades, the stirring speed is preferably 50 rpm to 1,200 rpm, although it may vary depending upon the shape of the stirring blades. The upper limit is more preferably 1,000 rpm or less, further preferably 800 rpm or less, and particularly preferably 600 rpm or less. The lower limit is more preferably 100 rpm or more, further preferably 200 rpm or more, and particularly preferably 300 rpm or more.

Representative types of the stirring blades include types of propeller, paddle, flat paddle, turbine, double cone, single cone, single ribbon, double ribbon, screw, and helical ribbon, however, the stirring blades are not particularly limited thereto as long as a shear force can be sufficiently applied to the system. Further, to perform efficient stirring, baffle plates or the like may be provided in the vessel.

Further, to produce an emulsion, it is possible to use not only stirrers but also any of widely known devices such as emulsifying machine and dispersion machine. Representative devices include batch-type emulsifying machines such as Homogenizer (supplied by IKA Corporation), Polytron (supplied by Kinematica, Inc.), and T. K. Autohomomixer (supplied by Tokushu Kika Kogyo Co., Ltd.), and others such as Ebara Milder (supplied by Ebara Corporation), T. K. Filmics, T. K. Pipeline Homomixer (supplied by Tokushu Kika Kogyo Co., Ltd.), Colloid Mill (supplied by Shinko-Pantec Co., Ltd.), and Slasher, Trigonal Wet Grinder (supplied by Mitsui Miike Kakoki Co., Ltd.), as well as ultrasonic homogenizers and static mixers.

The emulsion thus obtained is subsequently subjected to a step of precipitating fine particles.

To obtain composite polymer fine particles composed of the polyamide (A1) and the polymer (A2), a poor solvent for the polyamide (A1) is brought into contact with the emulsion produced by the above-described step to precipitate fine particles having a diameter in correspondence with that of the emulsion.

The contact between the poor solvent and the emulsion may be achieved by either pouring the emulsion in the poor solvent, or pouring the poor solvent in the emulsion, but it is preferred to pour the poor solvent in the emulsion.

The method of pouring the poor solvent is not particularly restricted as long as it is possible to obtain the polymer fine particles, and any of continuous dropping method, split dropping method and batch addition method may be employed. However, continuous dropping method and split dropping method are preferably employed because they can prevent coagulation, fusion or coalescence of the emulsion from being caused when adding the poor solvent, which may lead to a large particle size distribution or bulky grains larger than 1,000 µm, and to industrially perform it efficiently, the most preferred method is continuous dropping method.

Further, the time to add the poor solvent is preferably 5 minutes to 50 hours. The upper limit is more preferably 10 hours or less, and further preferably 5 hours or less. The lower limit is more preferably 10 minutes or more, further preferably 30 minutes or more, and particularly preferably 1 hour or more.

If it is carried out within a shorter time than these ranges, the emulsion will be likely to undergo coagulation, fusion, or coalescence, which may lead to a large particle size distribution or bulky grain. Further, the performance of the addition for a longer time than the above-described ranges is not practical in consideration of industrial performance.

Implementation within these time ranges serves to suppress coagulation among particles when the emulsion is converted to polymer fine particles, and to produce polymer fine particles having a narrow particle size distribution.

Although depending upon the state of the emulsion, the amount of the poor solvent to be added is usually from 0.1 to 10 parts by mass relative to 1 part by mass of the total mass of the emulsion. The upper limit is more preferably 5 parts by mass or less, further preferably 3 parts by mass or less, particularly preferably 2 parts by mass or less, and most preferably 1 part by mass or less. The lower limit is more preferably 0.1 parts by mass or more, and further preferably 0.2 parts by mass or more.

The time of the contact between the poor solvent and the emulsion is not limited as long as the time is sufficient to precipitate fine particles. However, to cause sufficient precipitation with high productivity, the contact time from completion of the addition of the poor solvent is preferably 5 minutes to 50 hours. The upper limit is more preferably 10 hours or less, further preferably 5 hours or less, particularly preferably 4 hours or less, and most preferably 3 hours or less. The lower limit is more preferably 5 minutes or more, further preferably 10 minutes or more, particularly preferably 20 minutes or more, and most preferably 30 minutes or more.

Powder of the fine particles can be collected by subjecting the dispersion liquid of the composite polymer fine particles thus obtained to a conventional solid-liquid separation method such as filtration, reduced pressure filtration, compression filtration, centrifugal separation, centrifugal filtration, spray drying and the like.

The composite polymer fine particles obtained from the solid-liquid separation can be purified, if needed, by washing them in a solvent or the like and removing impurities remained on the surface of or within the fine particles accordingly.

The method may have an advantage that it is possible to recycle and reuse the organic solvent and the polymer (B) which have been separated in the solid-liquid separation step carried out when producing powder of fine particles.

The solvent resulting from the solid-liquid separation is a mixture of the polymer (B), the organic solvent and the poor solvent. By removing the poor solvent from this mixture, the remaining liquid can be recycled as a solvent for forming the emulsion. The removal of the poor solvent can be carried out using a generally known method such as simple distillation, reduced pressure distillation, precision distillation, thin film distillation, extraction, membrane separation and the like, and preferred methods are simple distillation, reduced pressure distillation and precision distillation.

When distillation operation such as simple distillation or reduced pressure distillation is performed, heat is applied to the system and there is a possibility that heat decomposition of the polymer (B) or the organic solvent may be promoted, just as is the case in the production process of polymer fine particles. Therefore, the operation is preferably performed in an oxygen-free state, more preferably an inert atmosphere. More specifically, it is preferably preformed under an atmosphere of nitrogen, helium, argon, or carbon dioxide. Further, a phenolic compound may be again added as an antioxidant.

For recycling, it is preferred that the poor solvent is removed as much as possible. More specifically, the amount of the remaining poor solvent is 10 mass % or less, preferably 5 mass % or less, more preferably 3 mass % or less, and particularly preferably 1 mass % or less, relatively to the total amount of the organic solvent and the polymer (B) to be recycled. When the remaining amount of the poor solvent is over this range, the particle size distribution of fine particles may become broader or the particles may be coagulated, therefore these cases are not preferred.

The content of the poor solvent in the solvent mixture used for recycle can be measured by a generally known method such as gas chromatography or the Karl Fischer's method.

In practice, there may be a loss of the organic solvent or the polymer (B) during the operations for removing the poor solvent, thus it is preferred to appropriately adjust the composition ratio to the initial ratio when necessary.

It is possible to produce composite polymer fine particles, the thus obtained composite polymer fine particles having an average particle diameter of generally 1,000 µm or less, preferably 500 µm or less, more preferably 250 µm or less, further preferably 100 µm, and particularly preferably 50 µm or less. Further, it is possible to produce composite polymer fine particles in which the lower limit of the average particle diameter is generally 0.05 µm or more, preferably 0.1 µm or more, more preferably 0.5 µm or more, further preferably 0.8 µm or more, and particularly preferably 1 µm or more.

The fine particles produced by the method are composite polyamide fine particles having a dispersion structure where a different type of polymer is dispersed in each polymer fine particle, in which excellent fracture toughness, impact resistance, chemical resistance and the like intrinsic to polyamide fine particles are not impaired, which have various properties and characteristics such as high fracture toughness, impact resistance and heat resistance that cannot be achieved by polymer fine particles comprising a single type of polyamide, and which have a narrow particle size distribution and a high sphericity. Therefore, such composite polyamide fine particles are particularly suitable for use as a modifier for epoxy resin.

Further, it is expected that the composite polyamide fine particles can be used as a modifier for cosmetics, an additive for toner, a rheology modifier for paint and the like, and an agent for medical diagnosis and examination.

As a concrete application of the above-described resin moldings, films and fibers, representative examples include: electric and electronic components represented by electrical appliance housings, office appliance housings, various covers, various gears, various cases, sensors, LED lamps, connectors, sockets, resistors, relay cases, switches, coil bobbins, capacitors, variable capacitor cases, optical pickups, resonators, various terminal strips and boards, matching transformers, plugs, printed wiring boards, tuners, speakers, microphones, headphones, small motors, magnetic head bases, power modules, housings, semiconductors, liquid crystals, motor brush holders, parabola antennas, and computer components; domestic and office electric appliance components represented by video tape recorder components, TV set components, irons, hair dryers, rice cooker components, acoustic components, audio equipment components for audios and compact discs, lighting components, refrigerator components and air conditioner components; machine components such as office computer components, telephone components, facsimile components, copier components, cleaning jigs, various bearings (including oilless bearings, stern bearings, submerged bearings and the like), motor components and lighters; optical equipment and precision machine components represented by microscopes, binoculars, cameras and watches; and other components such as alternator terminals, alternator connectors, IC regulators, various valves (including emission valves and the like), various pipes for fuel, exhaust system and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flow meters, thermostat bases for air conditioners, hot air flow control valves, brush holders for radiator motors, water pump impellers, turbine vanes, wiper motor components, distributors, starter switches, starter relays, transmission wire harnesses, windshield washer fluid nozzles, air conditioner panel switch plates, fuel solenoid valve coils, fuse connectors, horn terminals, electric component insulators, step motor rotors, lamp sockets, lamp reflectors, lamp housings, brake pistons, solenoid bobbins, engine oil filters and ignition cases. Further, from the viewpoint of their excellent transparency and heat resistance, the fine particles can be applicable to the following uses: image equipment components such as cameras, video tape recorders, picture-taking lenses for projection TVs, finders, filters, prisms, Fresnel lenses and the like; optical recording and optical communication components such as optical disc boards for various optical discs (VD, CD, DVD, MD, LD and the like), films for protecting various optical disc boards, pick-up lenses for optical disc players, optical fibers, optical switches, optical connectors and the like; information appliance components such as liquid crystal displays, flat-panel displays, light guiding panels for plasma displays, Fresnel lenses, polarizing plates, films for protecting polarizing plates, phase difference films, light diffusion films, viewing angle expansion films, reflection films, anti-reflection films, anti-glare films, brightness improving films, prism sheets, pick-up lenses, light guiding films for touch panels, covers and the like; vehicle (automobile and the like) components such as tail lamp lenses, head lamp lenses, inner lenses, amber caps, reflectors, extensions, side mirrors, room mirrors, side visors, instrument needles, instrument covers, glazing represented by a window glass and the like; medical appliance components such as eyeglass lenses, eyeglass frames, contact lenses, endoscopes, optical cells for analysis and the like; and construction material components such as lighting windows, light transmitting boards for roads, transparent panels for roads, light covers, signage, transparent soundproof walls, materials for bathtubs and the like. The fine particles are remarkably useful for such various uses.

EXAMPLES

Hereinafter, our fine particles and methods will be explained in detail based on Examples, although this disclosure is not limited thereto.
(1) Methods of Measuring Average Particle Diameter, Particle Size Distribution Index and Sphericity The particle diameter of each fine particle was measured by observing polymer fine particles at a magnification of 1,000 times using a scanning electron microscope (JSM-6301NF, a scanning electron microscope supplied by JEOL Ltd.). When the particle observed was not a perfect circle, the longest diameter of the particle was regarded as its particle diameter. The average particle diameter was determined by measuring the diameters of 100 particles randomly selected from a scanning electron microscope photograph and calculating their arithmetic average.

The particle size distribution index, which represents the particle size distribution, was calculated from the following conversion equation using the diameters of respective particles obtained by the above description:

$$Dn = \sum_{i=1}^{n} Di/n$$

$$Dv = \sum_{i=1}^{n} Di^4 \bigg/ \sum_{i=1}^{n} Di^3$$

$$PDI = Dv/Dn.$$

Di represents diameter of each particle, n represents the number of measurements (100), Dn represents the number average particle diameter, Dv represents the volume average particle diameter, and PDI represents the particle size distribution index.

Sphericity is determined by measuring the long diameters and short diameters of 30 particles randomly selected in the aforementioned particle observation using scanning electron microscope, and calculating it based on the following equation:

$$S = \frac{\sum_{i=1}^{n}(D_{Si}/D_{Li})}{n} \times 100.$$

S represents the sphericity, $D_{Si}$ represents the shortest diameter, $D_{Li}$ represents the longest diameter, and n represents the number of measurements (30).
(2) Method of Verifying Dispersion Structure After embedding polymer fine particles in an epoxy resin for electron microscopy and curing the resin, the sample was prepared by frozen section technique with a thickness of 0.1 μm, and an observation of dispersion structure was carried out using a transmission electron microscope (supplied by Hitachi, Ltd., H-7100).
(3) Method of Measuring the Average Particle Diameter of Domains The average particle diameter of domains was defined as an average of diameters of corresponding true circles by measuring cross-sectional areas of 50 domains randomly selected from a transmission electron microscope photograph obtained by the observation in the above-described (2) and converting each domain to a true circle having an area equivalent to that of corresponding domain according to the following conversion equation:

$$D_{domain} = \frac{\sum_{i=1}^{n} \sqrt{4Si/\pi}}{n}.$$

$D_{domain}$ represents the average particle diameter of the domains, Si represents the cross-sectional area of each domain, and n represents the number of measurements (50).
(4) Determination of Melting Point and Glass Transition Temperature Based on Differential Scanning Calorimetry The melting point is defined as a peak top temperature of a melting peak observed in DSC curve that is obtained by using a differential scanning calorimeter (Robot DSC supplied by Seiko Instruments Inc.) under nitrogen atmosphere, heating at a heating rate of 20° C./min. from 30° C. up to a temperature 30° C. higher than the melting point of the polymer followed by keeping the temperature for 1 minute, cooling at a cooling rate of 20° C./min. down to 0° C. followed by keeping the temperature for 1 minute, and then measuring the DSC curve while heating again at a heating rate of 20° C./min.

The DSC curve is a curve plotted by a differential scanning calorimetry in which the vertical axis represents a differential between thermal energy inputs applied to a sample and a standard material per unit time, the thermal energy inputs being applied to the sample and the standard material respectively to equalize their temperatures, and the horizontal axis represents temperature.

Further, the glass transition temperature is determined based on the DSC curve obtained at the above-described second heating in the DSC measurement, and defined as a temperature of an intersection point where a straight line equidistant from two extrapolated baselines of high temperature side and low temperature side as measured in the vertical axis direction intersects a segment of the curve showing a step change of glass transition.

(5) Method of Composition Ratio Analysis

The composition ratio of polyamide (A1) and polymer (A2) was determined by measuring the obtained polymer fine particles with $^1$H-NMR (supplied by JEOL Ltd., JNM-AL400) using deuterated hexafluoroisopropanol as a solvent.

(6) Evaluation of Improvement of Fracture Toughness of Polymer

A. Preparation of Sample (Cured Epoxy Resin Board)

10 parts by mass of tetraglycidyl diamino diphenylmethane (supplied by Sumitomo Chemical Co., Ltd., "Sumiepoxy (registered trademark)" ELM434) as an epoxy resin, 70 parts by mass of m-aminophenol type epoxy resin (supplied by Huntsman Advanced Materials LLC, "Araldite (registered trademark)" MY0600) and 20 parts by mass of bisphenol F type epoxy resin (supplied by DIC Corporation, "EPICLON (registered trademark)" 830), and 15 parts by mass of polyether sulfone (supplied by Sumitomo Chemical Co., Ltd., "SUMIKAEXCEL (registered trademark)" 5003P) were added into a kneader, heated up to 160° C. while being kneaded, and kneaded for 1 hour at 160° C. to obtain transparent viscous liquid. After cooling down to 80° C. while kneading, 40 parts by mass of 3,3'-diaminodiphenylsulfone (Mitsui Fine Chemicals, Inc., 3,3'-DAS) and 74 parts by mass of polymer fine particles are added, and by kneading them further an epoxy resin composition was obtained. After defoaming the resin composition in vacuum, the composition was cured for 2 hours at 180° C. in a mold in which the thickness was controlled to be 6 mm. The temperature rising speed up to 180° C. was set to 1.5° C./min.

B. Method of Evaluating Fracture Toughness

A sample having a width of 12.7 mm was cut from the cured board with a thickness of 6 mm having prepared in the above-described A., then the critical intensity stress factor ($K_{Ic}$) of the cured epoxy resin sample was measured according to the SENB method described in ASTM D5045-96, and the factor was employed as an index of fracture toughness of polymer. The relative value of the factor is shown in Table 1 where the $K_{Ic}$ of a cured epoxy resin board having no polymer fine particles is set to 1.0 as a reference value. All property measurements were carried out under the condition at a temperature of 23±2° C. and a relative humidity of 50±10%.

Example 1

Method of Producing Transparent Polyamide/Polyamide Composite Polymer Fine Particles 16.8 g of transparent polyamide (weight average molecular weight: 17,000, supplied by Daicel-Evonik Ltd., "TROGAMID (registered trademark)" CX7323) as the polyamide (A1), 4.2 g of polyamide 12 (weight average molecular weight: 38,000, supplied by ARKEMA K.K., "Rilsan (registered trademark)" AESNOTL-44) as the polymer (A2), 31.5 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) as the polymer (B) and 297.5 g of N-methyl-2-pyrrolidone as the organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and stirred for 4 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time when approximately 200 g of the ion exchange water was added the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.6 g of white solid material. When the obtained powder were observed by a scanning electron microscope, they were polymer fine particles having a true sphere-like particle shape, an average particle diameter of 27 µm, a particle size distribution index of 1.18, and a sphericity of 96. The obtained polymer fine particles were embedded in an epoxy resin and an ultra thin slice thereof was prepared. When the slice was observed by a transmission electron microscope, a plurality of domains whose main component was polyamide 12 and which had an average particle diameter of 410 nm were dispersed in polymer fine particles. A content of polyamide 12 in the polymer fine particles was 18.9 volume % according to $^1$H-NMR. The melting point of the transparent polyamide used in this Example was 250° C., and the polyamide 12 had a melting point of 183° C. According to the calculation method, the transparent polyamide had a SP value of 23.3 $(J/cm^3)^{1/2}$, and the polyamide 12 had a SP value of 21.7 $(J/cm^3)^{1/2}$.

Example 2

Method of Producing Transparent Polyamide/Polyamide Composite Polymer Fine Particles 14.7 g of transparent polyamide (weight average molecular weight: 17,000, supplied by Daicel-Evonik Ltd., "TROGAMID (registered trademark)" CX7323) as the polyamide (A1), 6.3 g of polyamide 12 (weight average molecular weight: 38,000, supplied by ARKEMA K.K., "Rilsan (registered trademark)" AESNOTL-44) as the polymer (A2), 31.5 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) as the polymer (B) and 297.5 g of N-methyl-2-pyrrolidone as the organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and stirred for 4 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time when approximately 200 g of the ion exchange water was added the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.3 g of white solid material. When the obtained powder were observed by a scanning electron microscope, they were polymer fine particles having a true sphere-like particle shape, an average particle diameter of 29 µm, a particle size distribution index of 1.21, and a sphericity of 95. The obtained polymer fine particles were embedded in an epoxy resin and an ultra thin slice thereof was prepared. When the slice was observed by a transmission electron microscope, a plurality of domains whose main component was polyamide 12 and which had an average particle diameter of 470 nm were dispersed in polymer fine particles. A content of polyamide 12 in the polymer fine particles was 27.2 volume % according to $^1$H-NMR. The melting point of the transparent polyamide used in this Example was 250° C., and the polyamide 12 had a melting point of 183° C. According to the calculation method, the transparent polyamide had a SP value of 23.3 $(J/cm^3)^{1/2}$, and the polyamide 12 had a SP value of 21.7 $(J/cm^3)^{1/2}$.

Example 3

Figure 2:
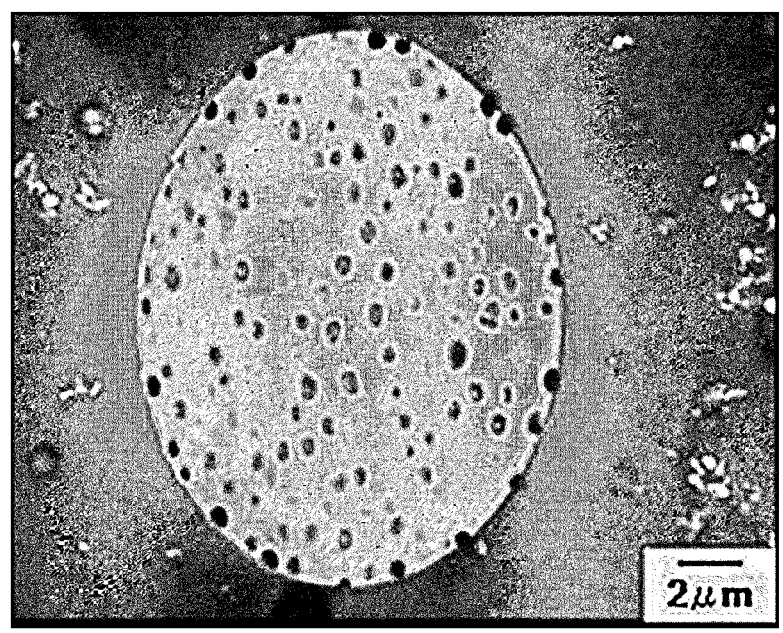
FIG. 2 is an observation diagram where a cross-section of the composite polyamide fine particles of FIG. 1 is observed using a transmission electron microscope.

Method of Producing Transparent Polyamide/Polyamide Elastomer Composite Polymer Fine Particles 18.9 g of transparent polyamide (weight average molecular weight: 17,000, supplied by Daicel-Evonik Ltd., "TROGAMID (registered trademark)" CX7323) as the polyamide (A1), 2.1 g of polyamide elastomer (weight average molecular weight: 27,000, supplied by Daicel-Evonik Ltd., "VESTAMID (registered trademark)" EX9200) as the polymer (A2), 31.5 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) as the polymer (B) and 297.5 g of N-methyl-2-pyrrolidone as the organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and stirred for 4 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time when approximately 200 g of the ion exchange water was added the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.3 g of white solid material. When the obtained powder were observed by a scanning electron microscope, they were polymer fine particles having a true sphere-like particle shape, an average particle diameter of 24 μm, a particle size distribution index of 1.17, and a sphericity of 96. The obtained polymer fine particles were embedded in an epoxy resin and an ultra thin slice thereof was prepared. When the slice was observed by a transmission electron microscope, a plurality of domains whose main component was polyamide elastomer and which had an average particle diameter of 520 nm were dispersed in polymer fine particles. A content of polyamide elastomer in the polymer fine particles was 8.5 volume % according to $^1$H-NMR. The melting point of the transparent polyamide used in this Example was 250° C., and the polyamide elastomer had a melting point of 176° C. According to the calculation method, the transparent polyamide had a SP value of 23.3 $(J/cm^3)^{1/2}$, and the polyamide elastomer had a SP value of 20.6 $(J/cm^3)^{1/2}$. FIGS. 1 and 2 show electron microscope views of the composite polyamide fine particles themselves and a cross-section thereof, respectively.

Example 4

Method of Producing Transparent Polyamide/Polyamide Elastomer Composite Polymer Fine Particles 16.8 g of transparent polyamide (weight average molecular weight: 17,000, supplied by Daicel-Evonik Ltd., "TROGAMID (registered trademark)" CX7323) as the polyamide (A1), 4.2 g of polyamide elastomer (weight average molecular weight: 27,000, supplied by Daicel-Evonik Ltd., "VESTAMID (registered trademark)" EX9200) as the polymer (A2), 31.5 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) as the polymer (B) and 297.5 g of N-methyl-2-pyrrolidone as the organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and stirred for 4 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time when approximately 200 g of the ion exchange water was added the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.1 g of white solid material. When the obtained powder were observed by a scanning electron microscope, they were polymer fine particles having a true sphere-like particle shape, an average particle diameter of 23 μm, a particle size distribution index of 1.19, and a sphericity of 96. The obtained polymer fine particles were embedded in an epoxy resin and an ultra thin slice thereof was prepared. When the slice was observed by a transmission electron microscope, a plurality of domains whose main component was polyamide elastomer and which had an average particle diameter of 580 nm were dispersed in polymer fine particles. A content of polyamide elastomer in the polymer fine particles was 16.8 volume % according to $^1$H-NMR. The melting point of the transparent polyamide used in this Example was 250° C., and the polyamide elastomer had a melting point of 176° C. According to the calculation method, the transparent polyamide had a SP value of 23.3 $(J/cm^3)^{1/2}$, and the polyamide elastomer had a SP value of 20.6 $(J/cm^3)^{1/2}$.

Example 5

Method of Producing Transparent Polyamide/Polyamide Elastomer Composite Polymer Fine Particles 14.7 g of transparent polyamide (weight average molecular weight: 17,000, supplied by Daicel-Evonik Ltd., "TROGAMID (registered trademark)" CX7323) as the polyamide (A1), 6.3 g of polyamide elastomer (weight average molecular weight: 27,000, supplied by Daicel-Evonik Ltd., "VESTAMID (registered trademark)" EX9200) as the polymer (A2), 31.5 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) as the polymer (B) and 297.5 g of N-methyl-2-pyrrolidone as the organic solvent were added into a 1,000 ml pressure resistant glass autoclave (supplied by Taiatsu Techno Corporation, Hyper Glaster, TEM-V1000N), after replaced with nitrogen of 99 volume % or more, heated up to 180° C., and stirred for 4 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time when approximately 200 g of the ion exchange water was added the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.7 g of white solid material. When the obtained powder were observed by a scanning electron microscope, they were polymer fine particles having a true sphere-like particle shape, an average particle diameter of 25 μm, a particle size distribution index of 1.22, and a sphericity of 94. The obtained polymer fine particles were embedded in an epoxy resin and an ultra thin slice thereof was prepared. When the slice was observed by a transmission electron microscope, a plurality of domains whose main component was polyamide elastomer and which had an average particle diameter of 610 nm were dispersed in polymer fine particles. A content of polyamide elastomer in the polymer fine particles was 25.1 volume % according to $^1$H-NMR. The melting point of the transparent polyamide used in this Example was 250° C., and the polyamide elastomer had a melting point of 176° C. According to the calculation method, the transparent polyamide had a SP value of 23.3 $(J/cm^3)^{1/2}$, and the polyamide elastomer had a SP value of 20.6 $(J/cm^3)^{1/2}$.

Example 6

Method of Producing Transparent Polyamide/Polyamide Elastomer Composite Polymer Fine Particles 18.9 g of transparent polyamide (weight average molecular weight: 17,000, supplied by Daicel-Evonik Ltd., "TROGAMID (registered trademark)" CX7323) as the polyamide (A1), 2.1 g of polyamide elastomer (weight average molecular weight: 27,000, supplied by Daicel-Evonik Ltd., "VESTAMID (registered trademark)" E62-S4) as the polymer (A2), 42.0 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) as the polymer (B) and 287.0 g of N-methyl-2-pyrrolidone as the organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and stirred for 4 hours until the polymers were dissolved. At that time, the concentration of oxygen is 1% or less theoretically. Thereafter, 350 g of ion exchange water was dropped as the poor solvent at a speed of 11.7 g/min. through a feeding pump. At the time when approximately 200 g of the ion exchange water was added the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.4 g of white solid material. When the obtained powder were observed by a scanning electron microscope, they were polymer fine particles having a true sphere-like particle shape, an average particle diameter of 10 μm, a particle size distribution index of 1.18, and a sphericity of 93. The obtained polymer fine particles were embedded in an epoxy resin and an ultra thin slice thereof was prepared. When the slice was observed by a transmission electron microscope, a plurality of domains whose main component was polyamide elastomer and which had an average particle diameter of 1430 nm were dispersed in polymer fine particles. A content of polyamide elastomer in the polymer fine particles was 8.5 volume % according to $^1$H-NMR. The melting point of the transparent polyamide used in this Example was 250° C., and the polyamide elastomer had a melting point of 173° C. According to the calculation method, the transparent polyamide had a SP value of 23.3 $(J/cm^3)^{1/2}$, and the polyamide elastomer had a SP value of 20.2 $(J/cm^3)^{1/2}$.

Example 7

Method of Producing Transparent Polyamide/Polyamide Elastomer Composite Polymer Fine Particles 18.9 g of transparent polyamide (weight average molecular weight: 17,000, supplied by Daicel-Evonik Ltd., "TROGAMID (registered trademark)" CX7323) as the polyamide (A1), 2.1 g of polyamide elastomer (weight average molecular weight: 27,000, supplied by Daicel-Evonik Ltd., "VESTAMID (registered trademark)" E55-S4) as the polymer (A2), 31.5 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) as the polymer (B) and 287.0 g of N-methyl-2-pyrrolidone as the organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and stirred for 4 hours until the polymers were dissolved. At that time, the concentration of oxygen is 1% or less theoretically. Thereafter, 350 g of ion exchange water was dropped as the poor solvent at a speed of 11.7 g/min. through a feeding pump. At the time when approximately 200 g of the ion exchange water was added the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.4 g of white solid material. When the obtained powder were observed by a scanning electron microscope, they were polymer fine particles having a true sphere-like particle shape, an average particle diameter of 10 μm, a particle size distribution index of 1.19, and a sphericity of 92. The obtained polymer fine particles were embedded in an epoxy resin and an ultra thin slice thereof was prepared. When the slice was observed by a transmission electron microscope, a plurality of domains whose main component was the polyamide elastomer and which had an average particle diameter of 1830 nm were dispersed in polymer fine particles. A content of polyamide elastomer in the polymer fine particles was 8.3 volume % according to $^1$H-NMR. The melting point of the transparent polyamide used in this Example was 250° C., and the polyamide elastomer had a melting point of 171° C. According to the calculation method, the transparent polyamide had a SP value of 23.3 $(J/cm^3)^{1/2}$, and the polyamide elastomer had a SP value of 19.7 $(J/cm^3)^{1/2}$.

Example 8

Method of Producing Transparent Polyamide/Polyamide Elastomer Composite Polymer Fine Particles 18.9 g of transparent polyamide (weight average molecular weight: 17,000, supplied by Daicel-Evonik Ltd., "TROGAMID (registered trademark)" CX7323) as the polyamide (A1), 2.1 g of polyamide elastomer (weight average molecular weight: 27,000, supplied by Daicel-Evonik Ltd., "VESTAMID (registered trademark)" E47-S4) as the polymer (A2), 31.5 g of poly(vinyl alcohol) (supplied by Nippon Synthetic Chemical Industry Co., Ltd., "Gohsenol (registered trademark)" GM-14, weight average molecular weight: 29,000, SP value: 32.8 (J/cm3)½) as the polymer (B) and 287.0 g of N-methyl-2-pyrrolidone as the organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and stirred for 4 hours until the polymers were dissolved. At that time, the concentration of oxygen is 1% or less theoretically. Thereafter, 350 g of ion exchange water was dropped as the poor solvent at a speed of 20.0 g/min. through a feeding pump. At the time when approximately 200 g of the ion exchange water was added the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.2 g of white solid material. When the obtained powder were observed by a scanning electron microscope, they were polymer fine particles having a true sphere-like particle shape, an average particle diameter of 14 μm, a particle size distribution index of 1.19, and a sphericity of 90. The obtained polymer fine particles were embedded in an epoxy resin and an ultra thin slice thereof was prepared. When the slice was observed by a transmission electron microscope, a plurality of domains whose main component was the polyamide elastomer and which had an average particle diameter of 2510 nm were dispersed in polymer fine particles. A content of polyamide elastomer in the polymer fine particles was 8.4 volume % according to 1H-NMR. The melting point of the transparent polyamide used in this Example was 250° C., and the polyamide elastomer had a melting point of 168° C. According to the calculation method, the transparent polyamide had a SP value of 23.3 (J/cm3)½, and the polyamide elastomer had a SP value of 19.2 (J/cm3)½.

Example 9

Method of Producing Transparent Polyamide/Polyamide Elastomer Composite Polymer Fine Particles 18.9 g of transparent polyamide (weight average molecular weight: 17,000, supplied by Daicel-Evonik Ltd., "TROGAMID (registered trademark)" CX7323) as the polyamide (A1), 2.1 g of polyamide elastomer (weight average molecular weight: 27,000, supplied by Daicel-Evonik Ltd., "VESTAMID (registered trademark)" E40-S1) as the polymer (A2), 31.5 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) as the polymer (B) and 287.0 g of N-methyl-2-pyrrolidone as the organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and then stirred for 4 hours until the polymers were dissolved. At that time, the concentration of oxygen is 1% or less theoretically. Thereafter, 350 g of ion exchange water was dropped as the poor solvent at a speed of 20.0 g/min. through a feeding pump. At the time when approximately 200 g of the ion exchange water was added, the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.3 g of white solid material. When the obtained powder were observed by a scanning electron microscope, they were polymer fine particles having a true sphere-like particle shape, an average particle diameter of 17 μm, a particle size distribution index of 1.20, and a sphericity of 88. The obtained polymer fine particles were embedded in an epoxy resin and an ultra thin slice thereof was prepared. When the slice was observed by a transmission electron microscope, a plurality of domains whose main component was the polyamide elastomer and which had an average particle diameter of 3240 nm were dispersed in polymer fine particles. A content of polyamide elastomer in the polymer fine particles was 8.2 volume % according to $^1$H-NMR. The melting point of the transparent polyamide used in this Example was 250° C., and the polyamide elastomer had a melting point of 167° C. According to the calculation method, the transparent polyamide had a SP value of 23.3 $(J/cm^3)^{1/2}$, and the polyamide elastomer had a SP value of 19.0 $(J/cm^3)^{1/2}$.

Examples 10-18

It was carried out to evaluate fracture toughness of the cured epoxy resin boards to which the composite polyamide fine particles produced in the above-described Examples 1-9 were added. The results are shown in Table 1. The fracture toughnesses improved by 110-160% in comparison with the case where the polymer fine particles are not added, and by 10-37% in comparison with the case where particles containing only one type of resin were used. Thus, the composite polyamide fine particles had the effect of improving the fracture toughness significantly.

Comparative Example 1

Method of Producing Composite Polymer Fine Particles Comprising Only One Type of Polyamide 31.5 g of transparent polyamide (weight average molecular weight: 17,000, supplied by Daicel-Evonik Ltd., "TROGAMID (registered trademark)" CX7323), 21.0 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) and 297.5 g of N-methyl-2-pyrrolidone as an organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and then stirred for 4 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time when approximately 200 g of the ion exchange water was added, the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 30.9 g of white solid material. When the obtained powder were observed by a scanning electron microscope, they were polymer fine particles having a true sphere-like particle shape, an average particle diameter of 23 µm, a particle size distribution index of 1.12, and a sphericity of 96. The obtained polymer fine particles were embedded in an epoxy resin and an ultra thin slice thereof was prepared. When the slice was observed by a transmission electron microscope, it had a homogeneous structure inside particles. The melting point of the transparent polyamide used in this Example was 250° C. According to the calculation method, the transparent polyamide had a SP value of 23.3 $(J/cm^3)^{1/2}$.

Comparative Example 2

Method of Producing Composite Polymer Fine Particles Comprising Only One Type of Polyamide 35.0 g of polyamide (weight average molecular weight: 12,300, supplied by EMS-CHEMIE (Japan) Ltd., "Grilamid (registered trademark)" TR55), 28.0 g of poly(vinyl alcohol) (supplied by Nippon Synthetic Chemical Industry Co., Ltd., "Gohsenol (registered trademark)" GM-14, weight average molecular weight: 29,000, SP value: 32.8 $(J/cm^3)^{1/2}$) and 287.0 g of N-methyl-2-pyrrolidone as an organic solvent were added into a 1,000 ml pressure resistant glass autoclave (supplied by Taiatsu Techno Corporation, Hyper Glaster, TEM-V1000N), heated up to 180° C. after performing replacement of the atmosphere in the autoclave with nitrogen by more than 99%, and then stirred for 4 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time when approximately 200 g of the ion exchange water was added, the system turned white. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 33.8 g of white solid material. When the obtained powder were observed by a scanning electron microscope, they were polymer fine particles having a true sphere-like particle shape, an average particle diameter of 21 µm, a particle size distribution index of 1.19, and a sphericity of 95. The obtained polymer fine particles were embedded in an epoxy resin and an ultra thin slice thereof was prepared. When the slice was observed by a transmission electron microscope, it had a homogeneous structure inside particles. The transparent polyamide used in this Example did not have the melting point but had a glass transition temperature of 150° C. According to the calculation method, the polyamide had a SP value of 23.3 $(J/cm^3)^{1/2}$.

Comparative Examples 3 and 4

It was carried out to evaluate fracture toughness of the cured epoxy resin boards to which the composite polyamide fine particles produced in the above-described Comparative Examples 1 and 2 were added. The results are shown in Table 1.

Comparative Example 5

The fracture toughnesses were evaluated by preparing the cured boards in a manner similar to the preparations of the cured epoxy resin boards in the above-described Examples except that the polymer fine particles were not added to the boards. The results of Examples 10-18 and Comparative Examples 3-5 were shown in Table 1.

TABLE 1

|  | Particles | Sphericity | Average particle diameter of polymer particles (µm) | Average particle diameter of domain (nm) | Fracture toughness ($K_{Ic}$) relative value |
| --- | --- | --- | --- | --- | --- |
| Example 10 | Example 1 | 96 | 27 | 410 | 2.1 |
| Example 11 | Example 2 | 95 | 29 | 470 | 2.2 |
| Example 12 | Example 3 | 96 | 24 | 520 | 2.2 |
| Example 13 | Example 4 | 96 | 23 | 580 | 2.4 |
| Example 14 | Example 5 | 94 | 25 | 610 | 2.5 |
| Example 15 | Example 6 | 93 | 10 | 1430 | 2.3 |
| Example 16 | Example 7 | 92 | 10 | 1830 | 2.4 |
| Example 17 | Example 8 | 90 | 14 | 2510 | 2.6 |
| Example 18 | Example 9 | 88 | 17 | 3240 | 2.6 |
| Comparative Example 3 | Comparative Example 1 | 96 | 23 | — | 1.9 |
| Comparative Example 4 | Comparative Example 2 | 95 | 21 | — | 1.7 |
| Comparative Example 5 | None | — | — | — | 1.0 |

INDUSTRIAL APPLICABILITY

The composite polyamide fine particles are suitable for various industrial uses such as modifiers for epoxy resin, various spacers, frosting agents for paints, abrasives, fixatives for pigments, solid lubricants, glidants, and removers.

The invention claimed is:

1. Composite polyamide fine particles comprising a polyamide (A1) having a melting point or a glass transition temperature higher than 100° C. and a polymer (A2) different from said polyamide (A1), wherein said polymer (A2) comprises at least one selected from the group consisting of a polyamide different from said polyamide (A1), a polyamide elastomer, a polyester, a polyester elastomer, an amorphous polyarylate, a polycarbonate, a polyethersulfone, a polyarylene ether, a polyetherimide, a polyamideimide, a polyether ketone and a polyetherether ketone, said composite polyamide fine particles have a dispersion structure in which a plurality of domains each having a particle diameter of 0.05 to 100 μm whose main component is said polymer (A2) are dispersed in a matrix having said polyamide (A1) as its main component, and said composite polyamide fine particles have an average particle diameter of 0.1 to 500 μm and a sphericity of 80 or more, and, when solubility parameters of said polyamide (A1) and said polymer (A2) are referred to as $\delta_{A1}$ and $\delta_{A2}$, respectively, a relation of $|\delta_{A1}-\delta_{A2}|\geq 1.6[(J/cm^3)^{1/2}]$ is satisfied.

2. The composite polyamide fine particles according to claim 1, wherein the content of said polymer (A2) is 0.1 to 50 volume % relatively to the whole of said composite polyamide fine particles.

3. The composite polyamide fine particles according to claim 2, wherein the particle size distribution index of said composite polyamide fine particles is 1 to 3.

4. The composite polyamide fine particles according to claim 1, wherein the particle size distribution index of said composite polyamide fine particles is 1 to 3.

* * * * *